United States Patent
Pratt

(10) Patent No.: US 6,814,829 B2
(45) Date of Patent: Nov. 9, 2004

(54) DUAL-AXIS METHOD AND MACHINE FOR PRODUCING PRE-PREG

(76) Inventor: William F. Pratt, 1184 E. 830 South, Pleasant Grove, UT (US) 84062

( * ) Notice: Subject to any disclaimer, the term of this patent is extended or adjusted under 35 U.S.C. 154(b) by 52 days.

(21) Appl. No.: 10/238,817

(22) Filed: Sep. 9, 2002

(65) Prior Publication Data

US 2003/0141010 A1 Jul. 31, 2003

Related U.S. Application Data

(60) Division of application No. 09/443,232, filed on Nov. 1, 1999, now Pat. No. 6,453,962, which is a continuation-in-part of application No. 09/238,873, filed on Jan. 27, 1999, now Pat. No. 6,287,664, which is a continuation-in-part of application No. 08/970,141, filed on Nov. 14, 1997, now Pat. No. 6,048,426.
(60) Provisional application No. 60/072,975, filed on Jan. 29, 1998.

(51) Int. Cl.[7] ................................................ B32B 5/02
(52) U.S. Cl. ...................... 156/177; 156/179; 156/324; 156/440
(58) Field of Search ................................. 156/177, 179, 156/324, 440

(56) References Cited

U.S. PATENT DOCUMENTS

| | | | | |
|---|---|---|---|---|
| 3,361,616 A | * | 1/1968 | Scharf | 428/376 |
| 3,937,559 A | * | 2/1976 | Ferrentino et al. | 385/114 |
| 4,481,055 A | * | 11/1984 | Clausen et al. | 156/177 |

* cited by examiner

Primary Examiner—Sam Chuan Yao
(74) Attorney, Agent, or Firm—Fehr Law Firm; Thompson E. Fehr

(57) ABSTRACT

An improved method for the manufacturing of wavy pre-preg material that moves a first group of rollers in a transverse and a longitudinal direction with respect to a second group of rollers, to place a sinuous waveform in a fiber reinforced matrix for the manufacture of a wavy pre-preg material. The fabrication of wavy fiber pre-preg (fibers pre-impregnated with epoxy resin as an example) can be accomplished with an automated control system that permits the creation of non-periodic or mixed waveforms. The improved apparatus for this process allows for a more accurate placement of fibers, production of a wider variety of usable waveforms, and increased quality of pre-preg produced.

18 Claims, 18 Drawing Sheets

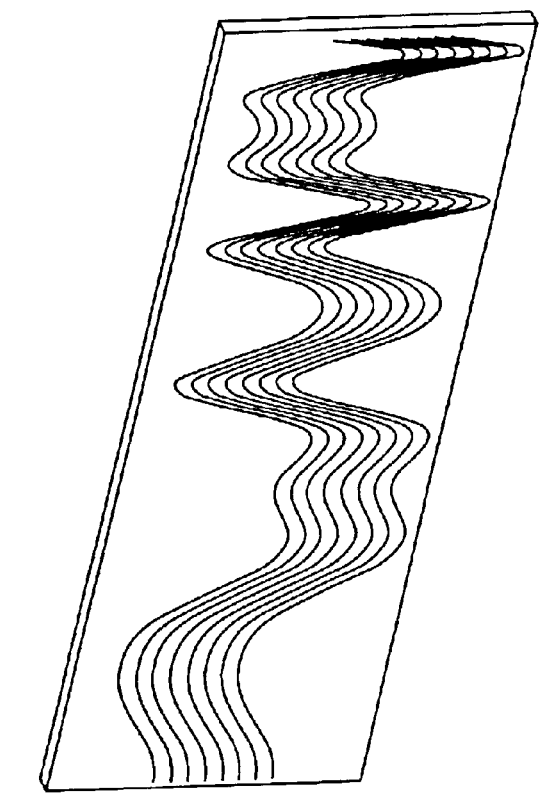
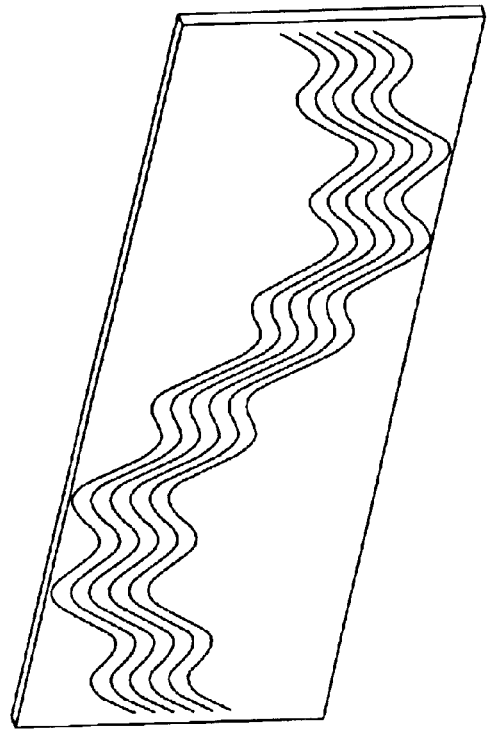
Fig. 4

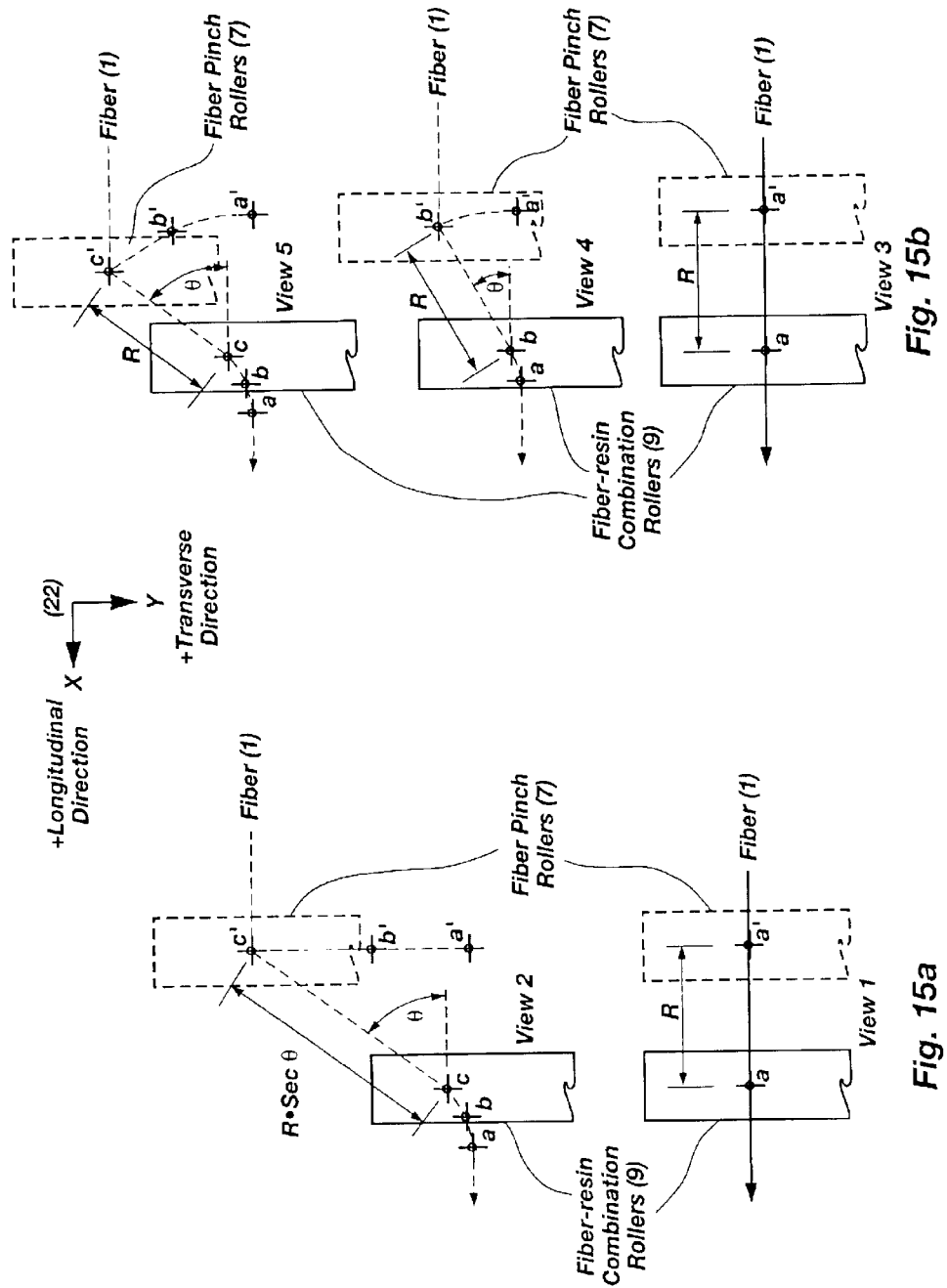

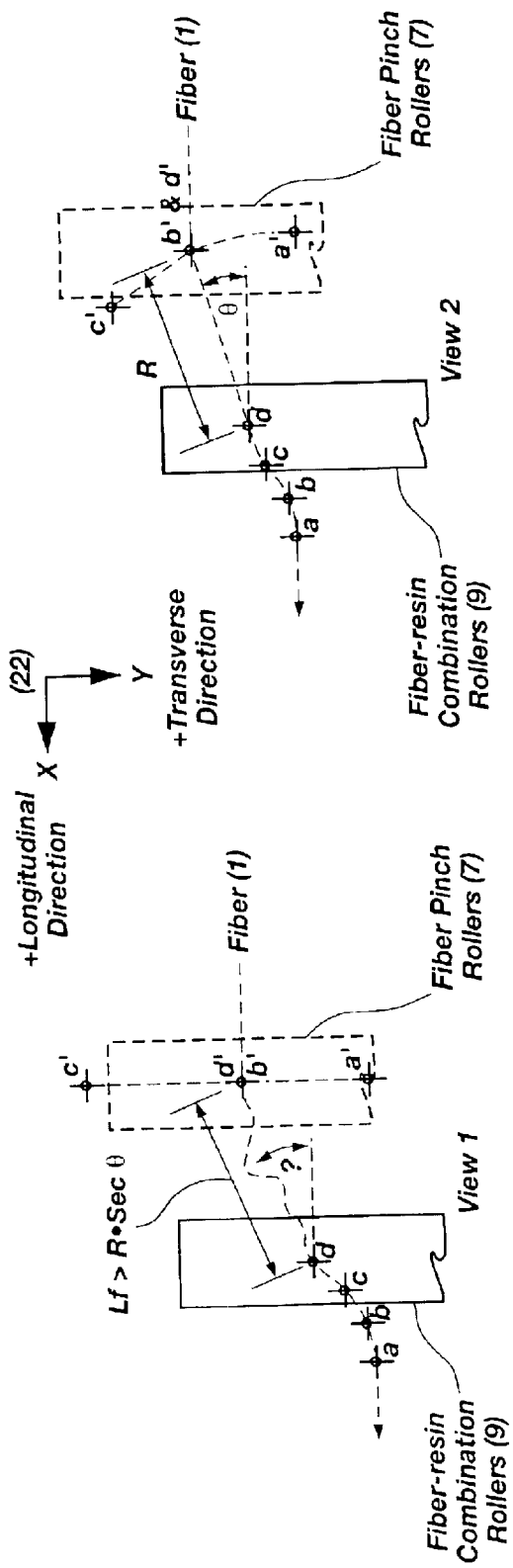
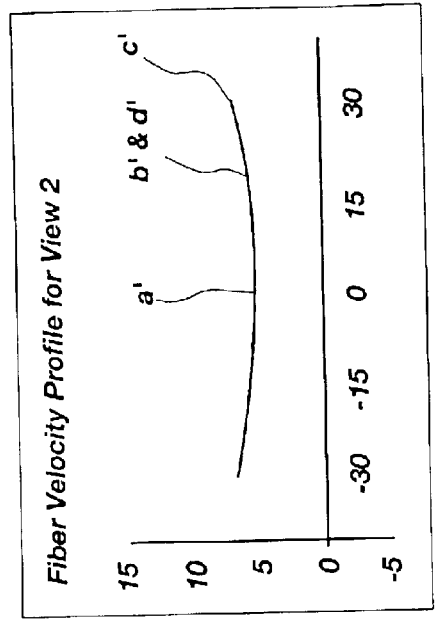
Fig. 16b
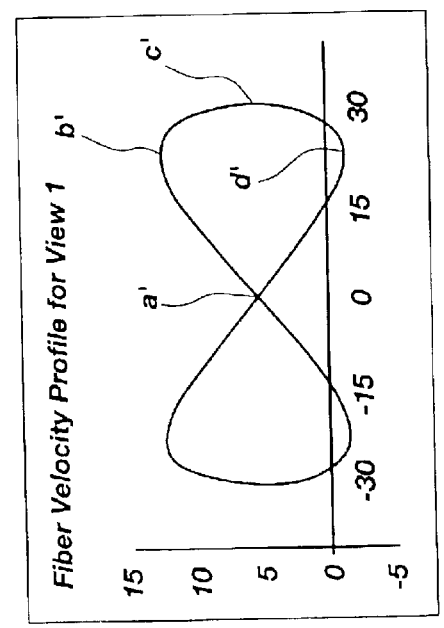
Fig. 16a

DUAL-AXIS METHOD AND MACHINE FOR PRODUCING PRE-PREG

CROSS-REFERENCE TO RELATED APPLICATION

This is a division of U. S. application Ser. No. 09/443,232, filed on Nov. 18, 1999, now U.S. Pat. No. 6,453,962, which was a continuation-in-part of U.S. application Ser. No. 08/970,141, filed on Nov. 14, 1997, now U.S. Pat. No. 6,048,426, and also a continuation-in-part of U.S. application Ser. No. 09/238,873, filed on Jan. 27, 1999, now U.S. Pat. No. 6,287,664, which claims the benefit of U.S. provisional application Ser. No. 60/072,975, filed on Jan. 29, 1998.

BACKGROUND OF THE INVENTION

1. Field of the Invention

This invention relates to the methods and apparatus for manufacturing wavy patterned fiber pre-preg that can be used in conjunction with viscoelastic materials to construct composite structures with unique damping properties. Such pre-pregs not only have an aesthetic appeal but also have the distinction of increasing their stiffness as a function of the angle of the fiber, due to the increase in fiber volume fractions as the fiber angle varies in the wavy or sinuous pattern.

2. Description of Related Art

The control of noise and vibration in composite structures is an important area of current research in aerospace, automotive and other industries. For example, spacecraft vibrations initiated by attitude adjusting thrusters, and motors inhibit accurate aiming of antennas and other equipment carried by the craft. Sound induced or structurally borne vibrations can cause severe damage to the craft and its associated equipment during launch.

Additionally, acoustic and vibration energy can be amplified at or near natural structural resonance due to low inherent damping in the materials used to make fairings and other structural components. A practical way of increasing damping and improving acoustic properties in mechanical structures is required.

Composite materials have been used to construct a wide variety of structural elements, including tubes, enclosures, beams, plates and irregular shapes. Objects as diverse as rocket motor housings and sporting goods, notably skis, archery arrows, vaulting poles and tennis rackets have been constructed from composite materials. While composite constructions have offered many significant advantages, such as excellent strength and stiffness properties, and light weight, the poor vibration damping properties have been of concern.

One of the simplest and often very effective passive damping treatments involves the use of thermo-viscoelastic (TVE) materials. These materials, represented by Avery-Dennison's FT series (FT-1191 is one example), exhibit both elastic and dissipative qualities which make them useful in a number of passive damping treatments.

Some of the first uses of thermo-viscoelastic materials to increase structural damping involved the use of surface patches of aluminum foil and viscoelastic adhesives. Called constrained or embedded-layer damping, these methods produce modest gains in damping.

One of the more common passive damping methods, Constrained Layer Damping or CLD is achieved by bonding a thin layer of metal sheet, usually aluminum, to an existing structure with a viscoelastic adhesive (Kerwin, 1959). Shear strains develop in the viscoelastic material when the original structure bends or extends. Damping occurs when the deformation of the viscoelastic adhesive creates internal friction in the viscoelastic material, generating heat and thus dissipating energy. Compared to an undamped structure, this approach is modestly successful but its effectiveness decreases markedly as the ratio of the thickness of the base structure to the thickness of the viscoelastic material increases (Hwang, et al, 1992).

Co-cured composite-viscoelastic structures are formed when layers of uncured fiber composites (pre-preg) and viscoelastic materials are alternately stacked and cured together in an oven. Damping occurs in these structures when a load causes differential movement of the opposing laminates, causing shearing in the sandwiched viscoelastic material. The various methods that use this concept of differential shearing of the viscoelastic material can be classified by the fiber orientation methods used to induce damping in the TVE material.

Conventional angled ply composite designs use $\pm\theta$ lay-ups of straight fiber pre-preg materials to encase the viscoelastic layers, and were first proposed by Barrett (1989) in a design for damped composite tubular components. Barrett combined the concepts of constrained layer damping with anisotropic shear coupling in the constraining composite layers to create a tube that achieved both high damping and high axial stiffness. Barrett's research showed that maximum shearing was experienced at the ends of the tubes and that clamping the constraining layers of the tube at the ends eliminated much of the damping effect, rendering the design impractical for most applications.

Chevron patterned designs also use conventional angled ply ($\pm\theta$) composite lay-ups of straight fibers but vary the fiber orientation several times throughout the structure in a given laminate. It was first proposed by Benjamin Dolgin (1990) of NASA and implemented by Olcott (1992).

In Olcott's implementation of Dolgin's design, each composite layer is comprised of multiple plies of pre-preg composite material arranged in a series of chevron-like patterns. Each composite layer is also comprised of several "segments" of material where the fiber angle in a given segment is oriented in a single direction throughout its thickness. Segments on opposite sides of the embedded viscoelastic material have the opposite angular orientation. At least two adjacent segments in a given composite layer are required to form a chevron and are joined together by staggering and overlapping the pre-preg plies in the segment.

By tailoring the fiber angle, thickness, and segment lengths, significant shearing in the viscoelastic layer was observed over the entire structure, not just at the ends as in Barrett's design (Olcott, 1992). Olcott's research showed that the fiber orientation, segment length, segment overlap length, material choice, and material thickness, had to be carefully controlled to maximize damping in a structure (Olcott, 1992).

Pratt, et. al. (co-pending U.S. application Serial No. 08970141) proposed several processes for making the wavy pre-pregs contemplated by Dolgin, their use in combination with viscoelastic materials for increased damping in composite structures, and the manufacture and use of several specialized wave forms.

The following terms used herein will be understood to have their ordinary dictionary meaning as follows:

| | |
|---|---|
| Composite: | made up of distinct parts. In the general sense, refers to any fiber reinforced material but especially any cured fiber reinforced matrix structure. |
| Carrier: | a conveyor, transporter. As used in this patent refers to the use of a cloth, plastic, paper, or other sheet products, to convey resin or matrix through a process for combusting with a fiber. |
| Fiber: | a thread or a structure or object resembling a thread. A slender and greatly elongated natural or synthetic filament. (Includes metal fibers) |
| Lamina(te): | a thin plate . . .: layer(s) |
| Matrix: | material in which something is enclosed or embedded. |
| Pre-preg: | Fiber reinforced, resin matrix impregnated materials where the matrix is partially cured and ready for use. A special "uncured" case of the more general term "Composite". |
| Resin: | an uncured binder, especially an uncured polymer binder or matrix used to bind fibers or fibrous materials; the matrix component of a an uncured pre-preg. |
| Viscoelastic: | having appreciable and conjoint viscous and elastic properties. |

Note: a special case of the term "viscoelastic" is "anisotropic viscoelastic", which is a viscoelastic material reinforced with fibers which give the material anisotropic properties. When the term viscoelastic is used in the text it should be construed to encompass this special case.

The following publications, incorporated herein by reference, are cited for further details on this subject.
1. Dolgin, Benjamin P., "Composite Passive Damping Struts for Large Precision Structures," 1990, U.S. Pat. No. 5,203,435.
2. Dolgin, Benjamin P., "Composite Struts Would Damp Vibrations," NASA Technical Briefs, 1991, Vol. 15, Issue 4, p. 79.
3. Olcott, D. D., "Improved Damping in Composite Structures Through Stress Coupling, Co-Cured Damping Layers, and Segmented Stiffness Layers," Brigham Young University, Ph.D. Thesis, August 1992.
4. Kerwin, "Damping of Flexural Waves by a Constrained Viscoelastic Layer," Journal of the Acoustical Society of America, 1959, Vol. 31, Issue 7, pp. 952–962.
5. Hwang, "Use of Strain Energy Based Finite Element Techniques in the Analysis of Various Aspects of Damping of Composite Materials and Structures," Journal of Composite Materials, 1992, Vol. 26, Issue 17, pp. 2585–2605.
6. Barrett, "A Design for Improving the Structural Damping Properties of Axial Members," Proceedings of Damping, 1989, Vol. HBC-1–18.
7. Horsting, Karl-Heinz, "Machine for the Production of Pre-Ready Made Reinforcement Formations," 1995, U.S. Pat. No. 5,788,804.
8. Ferrentino, Antonio and Beretta, Germano, "Opitcal Fiber Cable," 1976, U.S. Pat. No. 3,937,559.
9. Scharf, Walter G., "Flecked Metallized Yarn," 1968, U.S. Pat. No. 3,361,616.
10. Perrin, Frederic, "Process and Device for Applying a Thread onto a Support," 1999, U.S. Pat. No. 5,863,368.
11. Ikeda, Kazunari, and Sanada, Koichi, "Method of Manufacturing Member for use in Tire Including Engaging Wires Between Gears," 1991, U.S. Pat. No. 5,009,732.
12. Darrow, Burgess, "Reinforced Web," 1931, U.S. Pat. No. 1,800,179.

Horsting (reference 7 above) in columns 4 and 5 and FIGS. 1-5 presents a design for an apparatus for the deposition of wavy glass fibers in a thermoplastic matrix and/or a pre-preg process. Reference Horsting's FIG. 1, the process as described relies on the use of a fibrous mat carrier (2) as a substrate for the wavy fiber (11), a pin cushion conveyor (1) for locking the fiber into place during the laying of the fiber, and a roller (4) to push the fiber onto the pins of the pin cushion conveyor (1). A second layer of fibrous mat (3) is added to the top and the combination stripped from the pin cushion conveyor (1) by a stripping device (8) and passed between two heated rollers (6) for final consolidation of matrix and fiber. The keys to Horsting's process are the pin cushion conveyor (1) which holds the fibers in place, the fibrous mat (2 & 3) which holds the matrix, and the transverse and twisting movement of the roller (4) used to push the fiber onto the mat (2).

The Horsting process suffers from several weaknesses. Firstly, the process relies on the use of a non-standard substrate of fibrous material, presumably to give the substrate enough strength to withstand the insertion and removal of many pins from the pin cushion conveyor (1). Typical pre-preg processes carry a partially cured (and tacky) matrix on a sheet of paper or plastic. Called "resin paper" in the industry, typical thickness of matrix on the paper is 0.02 to 0.03 mm, and the paper is similar to common butcher paper in texture, thickness, and strength. Use of such standard resin paper would be impossible on Horsting's machine since the needles would shred the paper, displace the fibers, and create gaps in the pre-preg.

Secondly, the Horsting process relies on the use of needles to hold the shape of the fibers during the impregnation process. If it is assumed that there is at least a nominal tension on the fibers, the shape of the fibers would conform to a series of straight lines between succeeding pins. Thus, instead of a true sinuous shape, the fiber lay would more closely resemble a piecewise linear approximation of a sinuous wave. Additionally, the fibers would tend to bunch up vertically on the pins as the fibers were bent around the pins. Even if the roller (4) was able to push the fibers onto the matrix in the mat (2), there would still occur areas in the pre-preg where the fiber would be bunched up on the side of the pins. Even after consolidation of the fibers by the heated rollers (6) this bunching of fibers would cause areas in the pre-preg that were alternately fiber-rich or resin-rich. This causes areas of weakness where failures are more likely to occur in cured composite structures made from this pre-preg material. Finally, while bending fibers around small radius pins may be possible for some fibers such as cotton, rayon, etc., for high strength fibers such as carbon or graphite fibers, such small radius bends would result in breakage of the fibers. Experiments by the inventor with bending carbon fiber around pins to create a sinuous waveform resulted in severe problems in the pre-preg with areas of both non-uniform fiber distribution and fiber breakage.

Thirdly, Horsting relies on a roller (4) to push the fiber (11) onto the mat (2) and subsequently onto the needle conveyor (1). The movement of this roller is complex being both transversely to the direction of movement of material through the machine and rotationally about the vertical axis. This type of movement is incapable of creating a uniform sinusoidal waveform across the width. To create a true sinusoidal waveform it is necessary for axis of the roller (4) to maintain a perfectly perpendicular orientation to the direction of travel of material through the machine. If the roller is allowed to rotate about the vertical axis, the waveform on one end of the roller will be materially different than the waveform on the opposite side of the roller. This is because the swept distances of the two ends are different by a function of the apparent axis of rotation about the vertical axis. If the waveforms intended to be produced were sinusoidal (for example), only the fibers in the middle of the roller (4) would create the intended pattern. The patterns at the edges of the pre-preg would more closely resemble the absolute value of the sinusoid i.e., a series of convex semi-circles or scalloped patterns. If the roller is fixed about the vertical rotational axis, then in order to make the sinusoidal waveform, the roller would have to move transversely across the mat (2) with the roller (4) held rotationally fixed. As the roller is moved transversely, the tip of the underlying needles in the conveyor (1) would make a transverse oblique path through the fibers (11) causing some of the fibers to be misplaced in adjacent slots. Thus the waveform of the fibers next to the mat (2) would be of a different pattern than the fibers distant from the mat. Any derivative of such a device that involved the transverse movement of fibers across an array of needles will have the same problem. Additionally, instead of demanding the same amount of fiber across the width of the roller, a greater or lesser amount would be required from the opposite ends of the roller again depending on the apparent axis of rotation of the roller. This would likely cause problems with uniform fiber feed rates, quality, etc. Thus Horsting's device is incapable of producing a uniform fiber pattern both through the depth and across the width of the pre-preg and is limited in the variety of waveform lengths producible.

Ferrentino et al (reference 8 above) presented a design for an apparatus for embedding optical fibers in a thermoplastic matrix with a sinuous pattern. As described in columns 2–6 and shown in Ferrentino's FIG. 2, the key to the process is the transverse movement of the comb-like structure (12) which is used to separate the individual optical fiber cables. In many respects, the process shown in FIG. 2 is similar to standard industry practices for making fiber-reinforced pre-preg. If the Ferrentino process were applied to the manufacture of pre-preg where the individual optical fibers were replaced with tows of 15,000 (as an example) fibers, even without the sinuous pattern the resulting structure would resemble a series of fiber ribbons with significant gaps between adjacent tows. This is because the tow has not been flattened out sufficiently to present a uniform distribution of fibers throughout both the thickness and width. A typical pre-preg process requires a series of rollers to flatten the tow and cause even distribution of the fibers prior to encapsulation of the fibers in the resin matrix. This is an absolutely critical step in the production of fiber reinforced pre-preg. Without it, even if there were no visible gaps there would be significant areas of fiber or resin richness that would cause weakness in the pre-preg. Even pre-flattened tow would not be useable in this process since when moved to the side, the tow would ride up on the side of the pins subsequently presenting the tow to be encapsulated in a vertical instead of a horizontal or flattened manner. Thus the Ferrentino method, while useful for the production of embedded optical fibers, is unusable in the production of pre-preg where consistent fiber distribution and consistency in waveform is important.

For the reasons as stated for Ferrentino, Scharf's method for producing decorative yarn (reference 9) and Perrin's method for making sinuous pre-preg for tires (reference 10) both suffer from identical weaknesses since both rely on the use of a thread guide and are therefore incapable of producing sinuous pre-preg with uniform qualities across the width and throughout the thickness of the pre-preg. Both Scharf and Perrin contemplated the use of standard yarns for the fibers used to produce the sinuous materials. Perrin contemplated the use of the same methods for the production of graphite, glass or other fiber-reinforced pre-pregs but the reality is that the methods are not transportable for the reasons stated in the discussion of Ferrentino's apparatus (above). Neither Scharf's nor Perrin's methods would be able to produce a pre-preg (even without the sinuous shape) with uniform properties across the width or through the thickness of the pre-preg.

Ikeda et al (reference 11) presented an apparatus for placing sinusoidal bent wires in rubber for the production of tires. Ikeda et al relied on gears to cause a permanent vertical sinuous shape in metallic wires followed by a roller designed to cause them to lay on their side. While such a method may be useful for the permanent set of a metallic wire, such a method cannot be applied to fibers commonly used in the production of fiber-reinforced pre-preg. As an example, graphite fibers are flexible but it is impossible to cause them to have a permanent set. Graphite fiber, glass fiber, rayon, boron, and any other fiber normally used as reinforcement in a pre-preg will not retain a permanent set by the system proposed by Ikeda but will fracture instead. Ikeda et al also claim the use of a comb for spacing the metallic wires. The use of a comb will not permit even distribution of the fibers as is necessary in the production of a fiber reinforced pre-preg as discussed for Ferrentino's apparatus.

Darrow (reference 12), like Ikeda, proposed a device for obtaining a permanent sinuous waveform in metallic wires for the production of rubber tires. Such methods will not work for fibers commonly used in the production of fiber-reinforced pre-preg as discussed for Ikeda et al.

Dolgin (reference 1) proposed a specialty composite structure made from opposing chevron and sinusoidal patterned composite lamina constraining a viscoelastic layer. In reference 2 Dolgin stated that the production of wavy sinusoidal pre-preg should be possible but did not describe any process or apparatus.

The following paragraphs will discuss a typical pre-preg process as a prelude to understanding the process for producing wavy patterned pre-preg.

In a typical pre-preg process, multiple fiber tows from a creel are moved across a series of rollers, termed "spreader rollers," that progressively spread the fibers until the fibers obtain a uniform thickness and distribution across the width of the rollers. The fibers are then sandwiched between two sheets of coated paper that have a thin layer of partially cured resin. Typical resins are very tacky, have the consistency of taffy, and "grab" the surface fibers when moderate pressure from the combining rollers is applied. This locks the dry fiber, resin coated paper combination together.

This combination of dry fiber and resin paper then moves through a series of heated compaction rollers that thin the resin causing wicking of the resin into the fibers. The spacing between the heated compaction rollers is set to apply enough pressure to further spread the fibers which gives the pre-preg a uniform distribution of fibers, and a uniform thickness. After wicking of the resin into the fiber is completed, the combination is passed over a chill plate that cools the pre-preg, prevents curing, and thickens the fiber-resin combination. The pre-preg is drawn through a set of drive rollers, the top sheet is removed, and the finished pre-preg with its bottom sheet is rolled up on the take-up roller. This example is a simplified explanation that shows key steps in the process. Other steps could include edge trimming, paper backing exchanges, and other special processes. The process thus described is typical of a process used to produce unidirectional pre-preg. With minor modification, cloth pre-preg (made using woven fiber cloth) can be produced using the same basic process.

Typically, all rollers in contact with the fiber-resin paper combination are driven to prevent placing excessive strain on the resin-paper and causing breakage. Heated compaction rollers are typically made of steel with no special coating but the drive rollers are usually coated with a hard rubber coating to improving gripping of the resin-paper combination. Primary drive power is thus provided by the rubber coated drive rollers.

SUMMARY OF THE INVENTION

The present invention is directed to an apparatus and method for manufacturing wavy patterned fiber pre-preg materials. Generally, characteristics of the processes and machines include:

Laying the fiber(s) in a controlled wavy pattern that can be periodic or non-periodic; producing a fiber reinforced pre-preg material consisting of matrices containing continuous fibers. The matrices can consist of conventional polymers, viscoelastic materials, resins, or more exotic materials including (but not limited to) metal, ceramic, or combinations of materials. The fibers can consist of unidirectional tow or woven fabric.

The present invention is also directed to a wavy fiber pre-preg material that may be fabricated with a matrix with viscoelastic properties, i.e. the viscoelastic material may comprise all or part of the matrix material binding the fibers) and separate viscoelastic layers as well.

The present invention is also directed to the use of pinch rollers (used to grip the uniformly distributed fibers) attached to a table that moves in both a longitudinal or X and a transverse or Y direction that is used to impart the wavy pattern to the fibers as they are encapsulated in resinous or matrix material. This process permits the production of wavy pre-preg material (especially short wave-length waveforms) with greater consistency, accuracy, and uniformity. Unlike prior methods, this method and apparatus is capable of forming wavy fiber resin-impregnated pre-preg with uniform properties across the width and throughout the thickness of the pre-preg. Unlike prior methods and apparatuses, the present invention is capable of using existing standard materials (both fiber and resin paper) and processes, can be easily retrofitted to existing machines, and will permit the efficient and inexpensive production of both wavy pre-preg as well as conventional pre-preg without modifications or adjustments.

BRIEF DESCRIPTION OF THE DRAWINGS

The accompanying drawings (FIGS. 1–12) were incorporated in the original patent application and constitute a part of the specifications and preferred embodiment for that invention. They are presented here as reference and further explanation for FIGS. 13–16b.

FIG. 4 is a perspective view illustrating two examples of matrices according to yet another embodiment of the original invention.

The accompanying drawings (FIGS. 13–16b), which are incorporated in and constitute a part of the specification, illustrate preferred embodiments and serve to explain the principles of the present invention.

Figure 13:
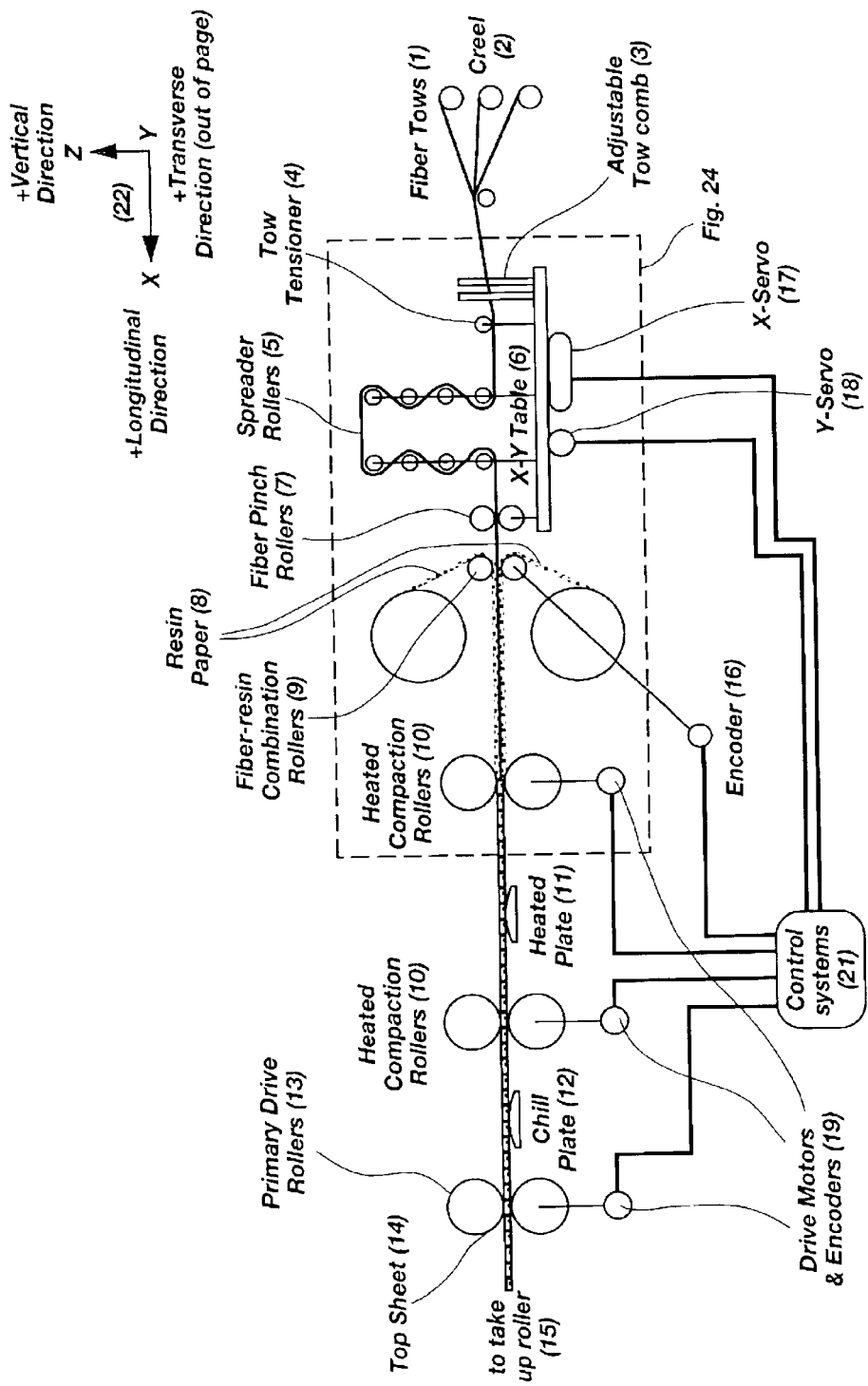

FIG. 13 is a schematic illustration according to the present invention for the manufacturing of a wavy pre-preg material.

Figure 14:
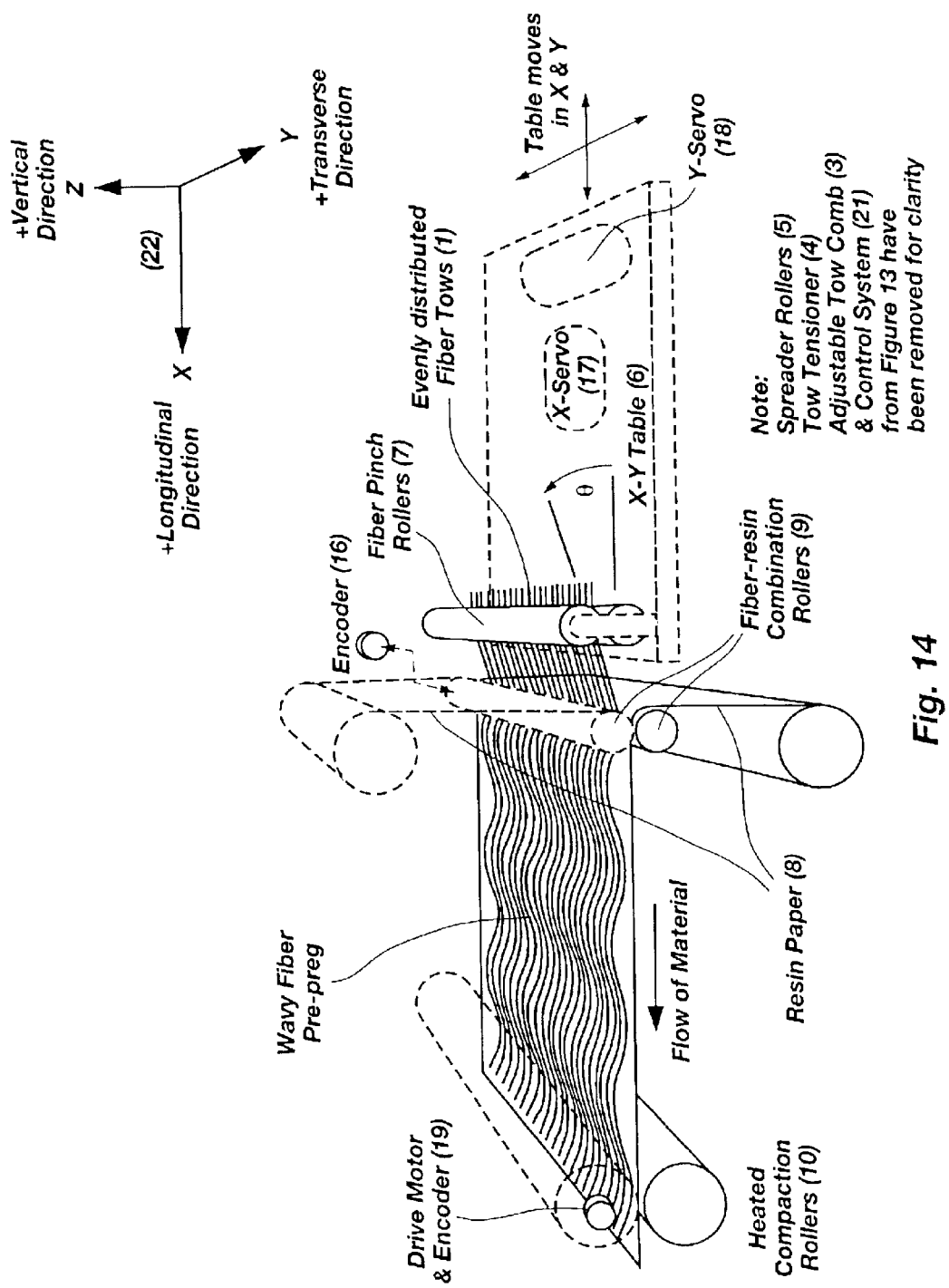

FIG. 14 is a schematic illustration according to the present invention of an apparatus for the manufacturing of a wavy pre-preg material.

FIGS. 15a and 15b are an illustration of the movement profile of the fiber pinch rollers and the fiber-resin combination rollers for the original process compared to the present improved process.

Figure 1:
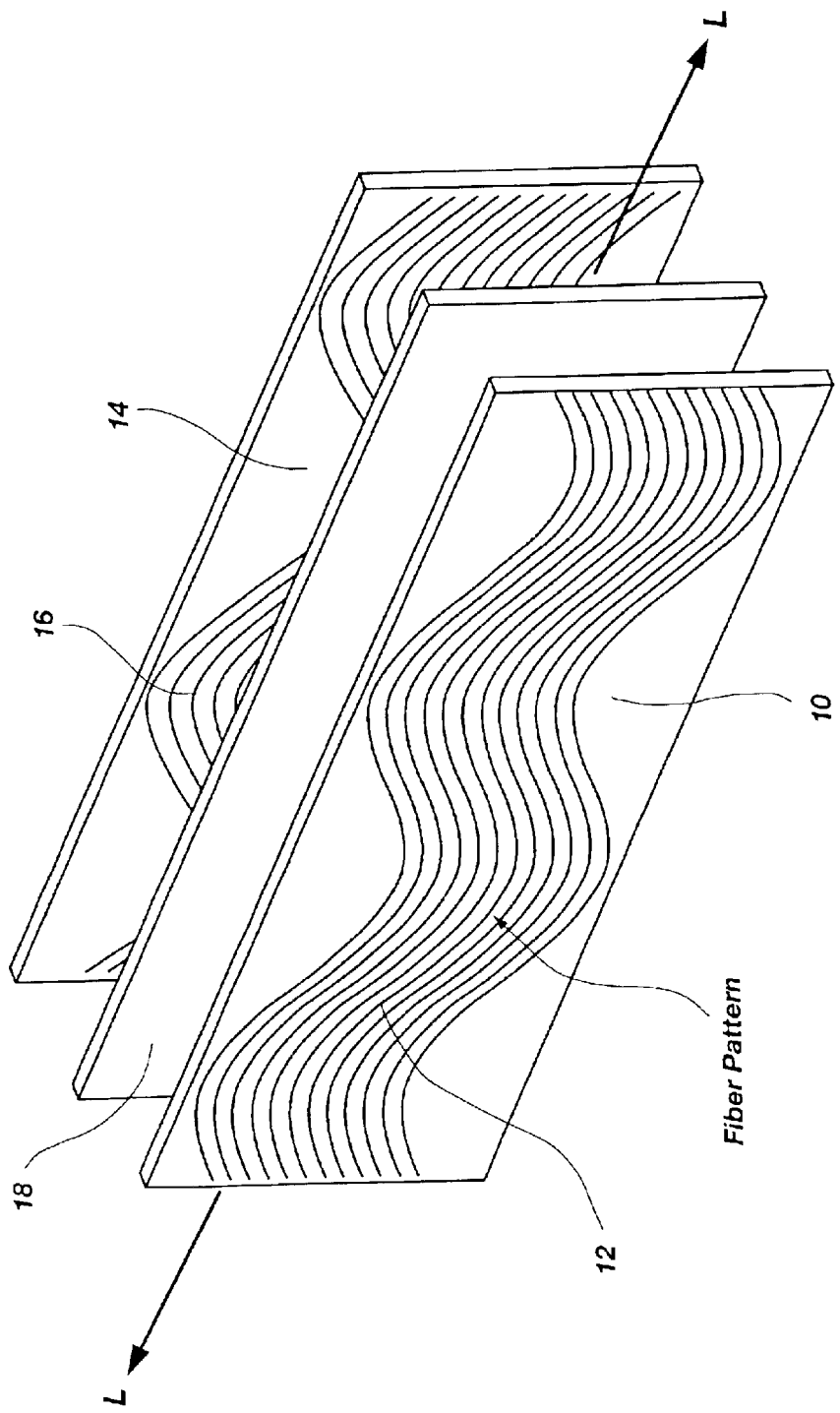
FIG. 1 is an exploded perspective view of a composite material according to a generalized embodiment of the original invention.

FIGS. 16a and 16b 1 are an illustration of the tow velocity profile for the original process compared to the present improved process and shows how the original process can cause the fibers to slacken between the fiber pinch rollers and the fiber-resin combination rollers.

DESCRIPTION OF THE PREFERRED EMBODIMENT

The improved wavy pre-preg manufacturing process contemplated by this patent application is capable of producing standard pre-preg (both unidirectional, and woven cloth) and is capable of producing wavy patterned fiber pre-preg (see FIG. 1).

The process utilizes the standard pre-preg process described in the description of prior art, with modifications and additional servos, drive motors, and computer automated controls to place a controlled wavy pattern in the lay of the fiber of the pre-preg. An apparatus for practicing an embodiment of a method of manufacturing continuous wave pre-preg materials is illustrated in FIG. 13. The basic process is described using polymer matrices containing carbon fibers for illustrative purposes and should not be construed as limiting the design or application of the machine. Any number of matrix materials can be used in combination with different fibers, woven mat, and any other fiber reinforcing material such as but not limited to glass, aramide, boron, etc. This example machine is capable of producing any number of different wavy patterns, combined patterns, and computer generated patterns optimized for a specific structure.

Original Prototype Limitations

In the original prototype machine (FIG. 7) in which only the Y-axis (transverse) moved (120) (e.g. no X-axis servo), the velocity of the tow (102) through the fiber pinch rollers (106) increased and decreased as the fiber angle of the tow was varied but the velocity of the fiber-resin combination (102 plus 110) passing through the rollers (108) remained constant. Because of the differing velocities of the fiber-resin rollers and the pinch rollers (106 & 108), a slack in the tension of the tow between the two sets of rollers would occur for all waveforms but would be especially evident in short wave-length waveforms as the fiber-resin rollers returned to zero degrees. This created uneven tow distribution and inaccurate waveforms. Other embodiments of the original concept provided for the single axis (transverse) movement of the fiber pinch rollers (106) or various single axis combinations of movement of rollers (106 & 108). In every case, the perpendicular distance between the two sets of rollers (106 & 108) was held constant. This method works only for relatively long wave-length waveforms and there remains the problem with inaccurate waveforms especially for shorter wave lengths.

The problem of slack occurring in the fiber tows between the two sets of rollers (106 & 108) was not anticipated or noticeable until construction of the prototype machine and actual production of wavy fiber.

Several methods of correcting this problem were attempted. The first method was to simply back-roll the pinch rollers (106) to take up unwanted slack, but this solution created additional problems. In the creation of longer waveforms where back-rolling of the pinch rollers would not be involved, the fiber tow exits the pinch roller (106) at the same location. However, when shorter waveforms are attempted and the roller is back-rolled (to take up slack in the fiber tow) with the fiber at an angle, the exit location of the fiber will change causing inaccuracies in the fiber angle and lay.

The second method was to decrease the diameter of the two sets of rollers (106 & 108). By decreasing the diameter of the rollers it would be possible to move the two sets of rollers closer together and decrease the distance between them. This would allow the theoretical production of waveforms with half wavelengths as small as the center-to-center distance between the two sets of rollers. This method is only practical for very small machines because as the diameter of the rollers is reduced, the bending stiffness of the rollers and therefore their uniform tow gripping power is adversely effected.

The third method, which is the subject of this present invention, was to vary the distance between the two sets of rollers (106 & 108). This improvement was not anticipated in the original concept nor was the prototype machine capable of varying the distance between the two sets of rollers.

In one embodiment of the original prototype machine the fiber-resin combination rollers (108), one set of heated compaction rollers (112) and the primary drive rollers (not shown but represented by 112) were all mounted on a table that moved transversely in the Y-axis (movement 120 or 122). While proving that wavy pre-preg could be manufactured, this single axis method was impractical for a larger, more production worthy machine.

Improved Process

In contrast, the process shown in FIG. 13 and described below, can be easily retrofitted to most existing pre-preg machines and will allow the production of both conventional pre-preg and wavy patterned pre-preg.

The preferred embodiment of the improved machine (FIG. 13) utilizes an X-Y table (6) which supports the adjustable tow combs (3), the tow tensioner (4), spreader rollers (5) and the fiber pinch rollers (7).

The purpose of the X-Y table (6) is to maintain uniform tension on the fiber tow (1) as the tow is placed onto the resin paper (8) to produce varying waveforms. The adjustable tow combs (3) provide uniform spacing of the tows and guides the tow onto the spreader rollers (5) and the tensioner (4). The purpose of the tow tensioner (4) is to prevent slackening of the tow between the spreader rollers (5) and the creel (2) during movement of the X-Y table (6). The purpose of the spreader rollers (5) is to spread the fibers of the tow bundles from a compact grouping to a uniformly thin layer of fibers. By the time the fibers in the tows (1) reach the fiber pinch rollers (7), they will present a uniformly distributed, thin layer of fibers without gaps.

In an example machine shown in FIG. 13 the continuous fibers or tow (1) are fed into the machine from a series of spools or creel (not shown) generally in a positive longitudinal or "X" direction (see directional key (22) in FIG. 13). The fibers pass through a set of adjustable combs (3) across a tensioner (4) and through a set of spreader rollers (5) that flatten the fiber tow into a uniform thickness. The tow then passes through a set of fiber pinch rollers (7) which place sufficient compression on the tow to prevent transverse slippage of the fibers (1). The fiber pinch rollers (7) are preferably covered with a compliant coating to prevent chopping of the fibers. The use of fiber pinch rollers with a compliant coating to direct and hold the fibers (instead of combs or guides as used in references 8–10) permits the control of dry un-impregnated fibers after they have already been spread into a uniform layer. None of the methods described in the prior art (references 7–12) permit the spreading of the tow bundles prior to encapsulation by the resin. Prior methods (references 8–10) prevent uniform distribution of the fibers in the pre-preg. In contrast, the present invention compresses the uniformly spread fiber layer along a narrow line of contact between the two pinch rollers (7) and takes advantage of the friction of the compressed fibers to prohibit transverse movement of the fibers relative to the pinch rollers (7) while maintaining the uniformity of the distribution of the fibers through the thickness and across the width.

On the improved machine concept (FIG. 13), the X-Y table (6) moves both in the X or longitudinal direction and in the Y or transverse direction to prevent slackening of the fiber between the two sets of pinch rollers (7 & 9) and is preferably controlled by individual servos and run by computerized programs. In this preferred embodiment the fiber-resin combination rollers (9), heated compaction rollers (10), heated plate (11), chill plate (12), primary drive rollers (13) and take up roller (15) would all remain stationary as is common on most pre-preg machines. Only the X-Y table (6) with attached components (3, 4, 5, & 7) would move in the X-Y or longitudinal-transverse plane. FIG. 13 is illustrative and should not be construed as limiting the design. For example, while the spreader rollers (5) are shown vertically oriented, it is possible to place the rollers in different configurations. It is also possible to produce the wavy pre-preg using woven cloth (bi-directional cloth is normally used) by removing one or more of items 3 through 5 as necessary and adding a spool with the cloth wound on it.

Unlike Horsting where the roller (Reference 7, FIG. 1 item 4) is allowed to rotate about the vertical axis (which creates an inaccurate waveform), the pinch rollers of FIG. 13 (item 7) are maintained (preferably) perfectly parallel at all times to the fiber-resin combination rollers (9). Although it is preferable to maintain the rollers (7) and (9) perfectly parallel, maintaining the rollers substantially parallel will result in an acceptably accurate waveform. This parallel movement of rollers (7) and (9) in the X-Y or longitudinal-transverse plane, insures that the waveform intended to be produced is accurately embedded in the resin across the entire width of the pre-preg not just at center as is a limitation of Horsting's method.

Also illustrated in FIG. 13 is the manner of controlling the movement of the X-Y table. In general, any desired waveform for the fibers may be made using in the general case, drive mechanisms (17, 18) (such as a motor and appropriate gearing) and mechanical linkage to provide control of the motion of the X-Y table (6). In the preferred embodiment, computer control was used to provide flexibility in creating different waveforms. It is also possible to replace the computer-servo control with a series of cams and drive mechanisms, or mechanical computers run by punch tape or punch cards. There are many ways to run the process but the key is the movement of the X-Y table in coordination with the movement of the fiber and resin paper through the machine.

FIG. 14 illustrates additional detail for the movement of the fiber pinch rollers (7) and the X-Y table. The fiber-resin paper combination rollers (9) are shown with an encoder (16) and the heated compaction rollers (10) are shown with encoders and drive motors (19) which are used to control the movement of materials through the machine and the longitudinal and transverse relative movement of the X-Y table (6) to which the fiber pinch rollers (7), the spreader rollers (5), the tow tensioner (4), and the tow comb (3), are attached. Since paper stretching can be a problem (which can cause inaccuracy in waveforms), it may be desirable to add a drive motor to the fiber-resin combination rollers (9). The use of an encoder (16) attached to the fiber-resin paper combination rollers (9) provides a "master" for the "slaved" movement of the X-Y table (6) combination, the heated-compaction rollers (10), and the primary drive rollers (13). Again, FIG. 14 and the above explanation is illustrative of the concept and should not be construed as limiting the design. Using motors and/or feedback to drive the compaction rollers (10) provides for better control of the fiber-resin paper combination through the machine. For example, it is possible to drive the heated compaction rollers (10) and the primary drive rollers (13) without the benefit of a sophisticated computer controlled feedback system. One could simply drive the rollers (10 & 13) with any suitable motor at a (preferably) constant speed. The information from the encoder (16) linked to the fiber-resin combination rollers would provide the information required for the computer coordinated movement of the X-Y table (6). Additionally, as previously stated, the use of computer control provides flexibility but the same control of the X-Y table could be provided by the use of cams, drive mechanisms, and linkages, punch tape, punch cards, etc. to provide the necessary coordination of the table assembly and heated and drive rollers.

Detailed Analysis of the Improved Process

The advantage of the improved machine design can be illustrated using plots of the movement of a single example fiber (FIG. 14, item 1) through the fiber pinch rollers (FIG. 14, item 7) and the fiber-resin combination rollers (FIG. 14, item 9). FIGS. 15a and 15b show the movement profile of the fiber pinch rollers (7) of the original process (FIG. 15a) compared to the movement profile of the improved process (FIG. 15b). The perspective of both views is from above (see the direction convention, item 22). In all views of FIGS. 15a, 15b, 16a and 16b, the top roller of each pair, and the resin paper have been removed, and only one fiber is shown in each view for clarity.

FIG. 15a, views 1 & 2 show the progression of the fiber (1) and the movement of the fiber-resin combination rollers (9) of the original process. Each fiber contacts the appropriate roller along a narrow line of contact labeled a,b,c for the fiber-resin combination rollers (9), and a',b',c' for the fiber pinch rollers (7). Contact points a-c are made on resin paper (FIG. 14 item 8) (not shown) as it rolls through the fiber-resin combination rollers (9) and continue the progression through the machine. Thus, in view 2 of FIG. 15a and views 4 and 5 of FIG. 15b, contact point "a" continues its movement to the left through the machine in combination with the resin paper (FIG. 14 item 8) (not shown). In contrast, points a'–c' represent the point of contact for the example fiber on the fiber pinch rollers (7). As shown, the transverse location of contact points a'–c' on the fiber pinch rollers (7) never change since the alignment of the tows entering the machine are set by the tow combs (FIG. 13, item 3) which is rigidly mounted to the X-Y table.

When the fiber angle is zero degrees (FIG. 15a view 1 & FIG. 15b view 3), both the pinch rollers (7) and fiber-resin rollers (9) rotate at the same velocity. For every unit length of fiber-resin paper passing between the fiber-resin combination rollers (9), a unit length of fiber moves between the fiber pinch rollers (7). This is shown in FIG. 15a views 1 & 2 as location "a" on the fiber-resin combination rollers (9) and a' on the fiber pinch rollers (7).

As an inherent characteristic of the process, the fiber volume fraction changes as a function of the Secant of the fiber angle. Thus for both processes, when the fiber angle deviates from 0°, more fiber is combined with the resin. In other words, for a given fiber angle θ, while a unit length of resin paper passes between the fiber-resin paper combination rollers (9), a Secant θ length of fiber moves between the fiber pinch rollers (7). This phenomenon is shown in FIG. 15a view 2.

As shown in FIG. 15a views 1 & 2, only single axis transverse control was exercised over the fiber-resin combination rollers (9) and the distance between the two sets of rollers was held constant. As the fiber-resin rollers (9) moved in the positive Y or transverse-axis towards the maximum fiber angle, the length of fiber tow (R·Sec θ) between the two sets of pinch rollers (view 2, positions c & c') increased, resulting in a dramatic increase in velocity of the pinch rollers (7) and tension on the fiber. The maximum tow velocity experienced by the original process using this example is shown at location b' in FIG. 16a. As the fiber angle begins to return from its maximum towards 0°, the length of the tow between the two sets of rollers (items 7 & 9 FIG. 13) begins to decrease. The fiber-resin combination rollers (FIG. 13 item 9) continue to turn at a constant velocity while the velocity of the fiber pinch rollers (FIG. 13, item 7) decreases, creating a decrease in tension on the fiber tow. As long as the wave-length is greater than the center-to-center distance between the two sets of rollers, the minimum speed of the fiber through the fiber pinch rollers (FIG. 13, item 7) will be positive. However, if the wavelength is less than the roller spacing, the net velocity of the fiber through the fiber pinch rollers (FIG. 13, item 7) will drop below zero (FIG. 16a location d') which means that the fiber has slackened to the point where the fiber has lost all tension. This loss of tension creates non-uniform distribution of the tow and irregularities in the wave fiber angles. Thus the original process (FIG. 7) was restricted in the useable waveforms it could accurately produce.

The improved process illustrated in FIGS. 13 & 14, has the ability to modify the distance between the two sets of rollers (items 7 and 9) and thus fiber length passing between the two sets of rollers. This allows accurate production of smaller waveforms and prevents large fluctuations in tow tension.

FIG. 15b shows the movement profile of the improved process through successive transverse positions of the fiber pinch rollers (7). Like the original process, when the fiber angle is 0° as in View 3, for every unit of resin paper, a unit of fiber is combined with the resin. In View 4, the fiber pinch rollers (7) have moved in the negative transverse and positive longitudinal direction to maintain the length of fiber between the current contact points b & b' constant (value R) and has induced an angle of θ in the fiber. Now for every unit of resin paper passing through the fiber-resin combination rollers (9), a Secant θ of fiber is combined. Likewise, in View 5, the angle is increased, and the fiber pinch rollers (7) are moved in both transverse and longitudinal directions to maintain a constant length of fiber between the new contact points c & c'.

For both the original and improved process, given a constant angle θ, a Secant θ of fiber will be combined with every unit of resin paper. However, unlike the improved process, the differential movement of the rollers (7 & 9) of the original process imposed an additional and pronounced variation in the flow of fiber through the fiber pinch rollers. As shown in FIG. 16a, and view 1 of FIG. 16a, this can cause slackening of the fiber between the two groups of rollers (7 & 9) and results in an unusable product.

The improved process has no such limitations. As the fiber pinch roller returns from its maximum angle (position c & c' of FIG. 16b View 2), the longitudinal and transverse location of the fiber pinch roller (7) is adjusted to maintain a constant length of fiber between roller groups 7 & 9. This maintains a more uniform velocity of the fiber (1) through the pinch rollers (7) as shown in FIG. 16b. In fact, with the new process, the velocity of fiber (1) need never drop below that of the 0° value (position a & a' of FIG. 16b) for any wave length. The velocity profile of the fiber (1) passing through the fiber pinch rollers (7) of the improved process, shown in FIG. 16b demonstrates the smoothing effect of a simple arc movement of the X-Y table on the velocity of the tow moving through the pinch rollers. This arc movement is illustrated by the fiber pinch-roller contact points a'–d' shown in View 2 of FIG. 16b. The X-Y table movement profile (contact points a'–d' in View 2 of FIG. 16b) is illustrative and works well enough for sinuous fiber wave patterns. Of course these examples are illustrative of the concept of the X-Y table and its effect on the velocity of the tow through the pinch rollers and hence quality of the wavy pre-preg. While the examples were developed using a sinusoidal waveform for the pre-preg and a simple circular arc segment for the X-Y table movement; other fiber patterns will necessitate different moves. Therefore these examples should not be construed as limiting the design, control methods, or algorithms. Other patterns and movement profiles will be obvious to one skilled in the art.

Figure 7:
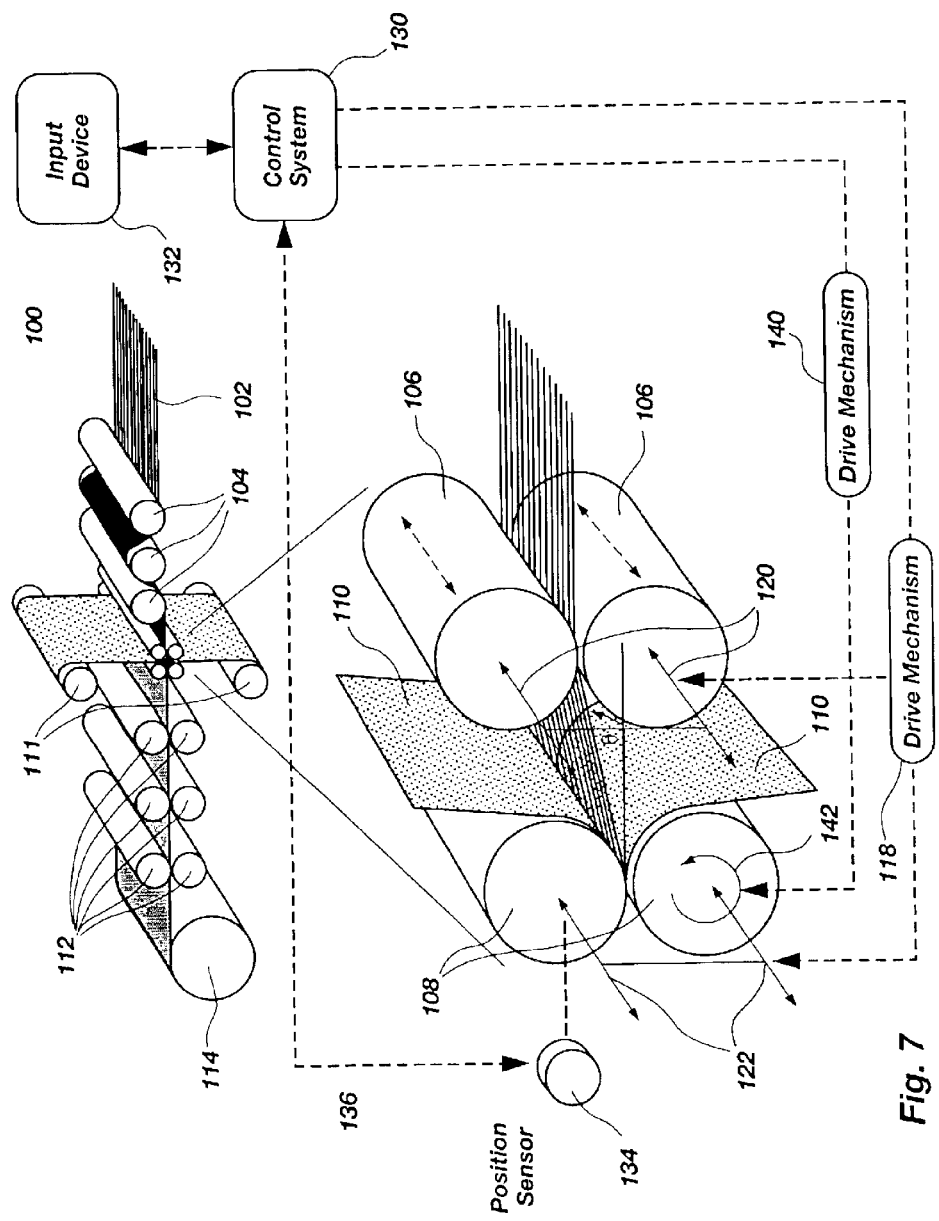
FIG. 7 is a schematic illustration of an apparatus according to the original invention for manufacturing a wavy pre-preg material.
Figure 8:
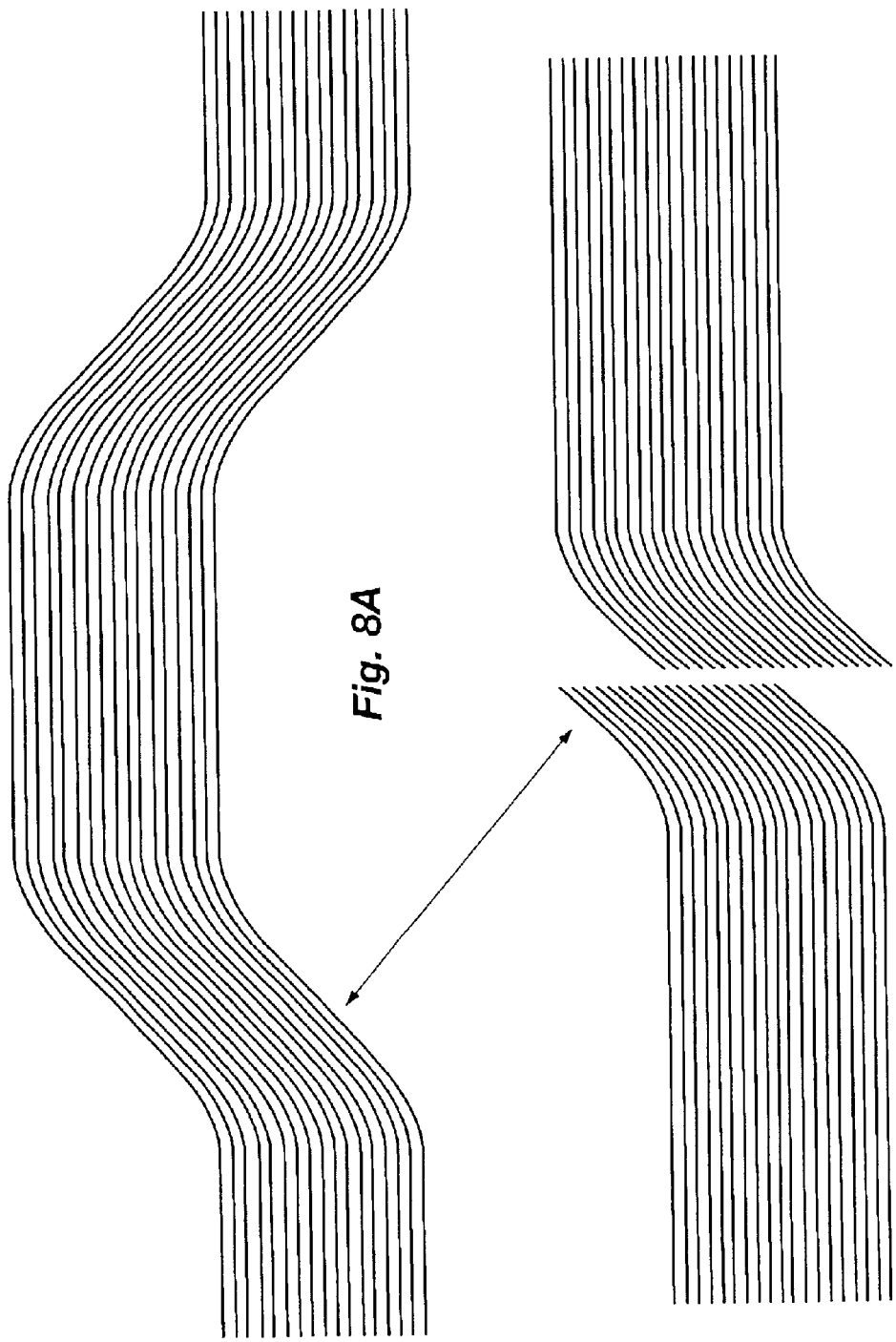
FIGS. 8A and 8B are illustrations of bent fibers showing how the volume fraction is enhanced with the use of bending.
Figure 9:
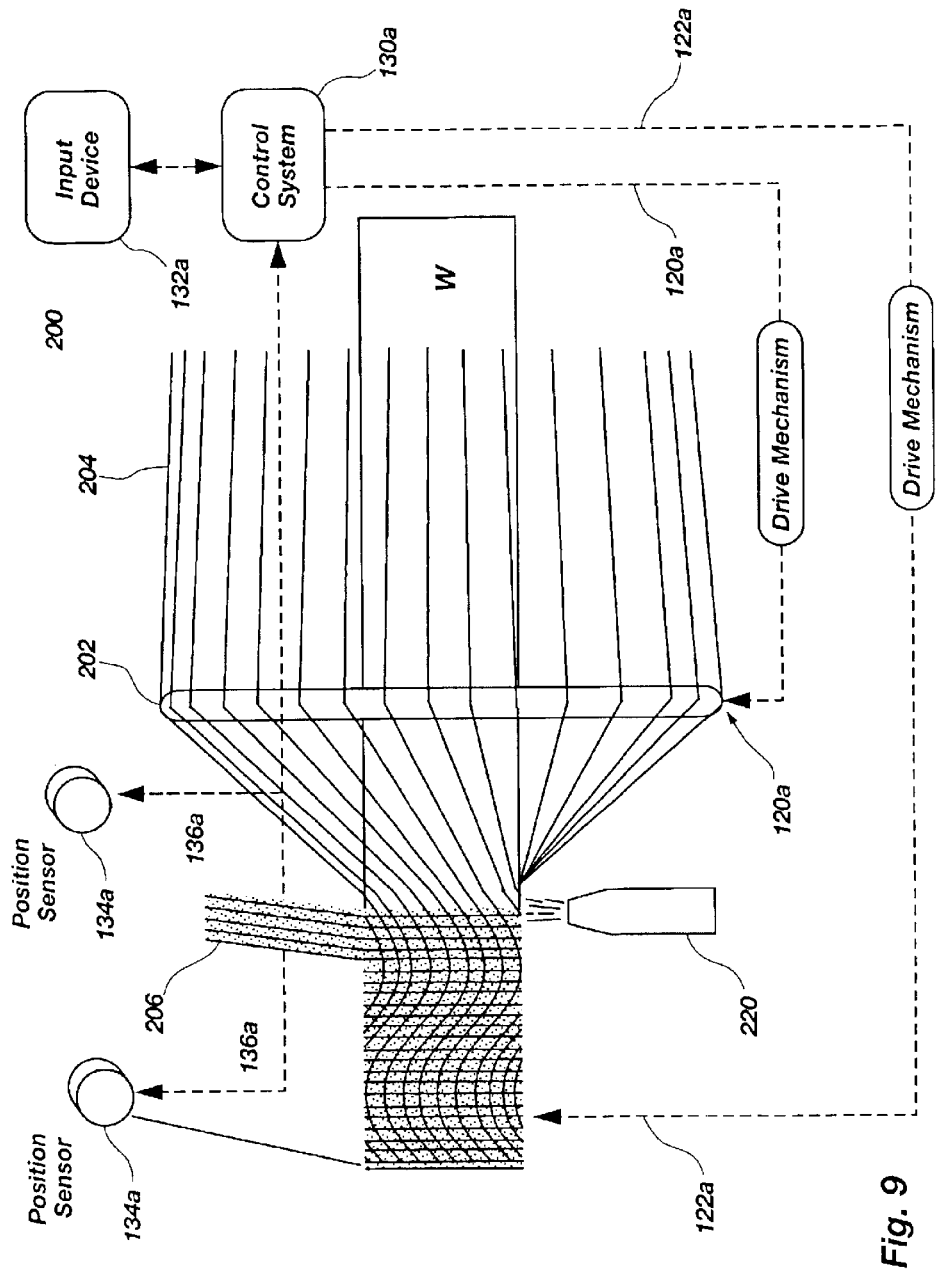
FIG. 9 is a schematic illustration of an alternate apparatus according to the original invention for manufacturing a wavy pre-preg material.
Figure 10:
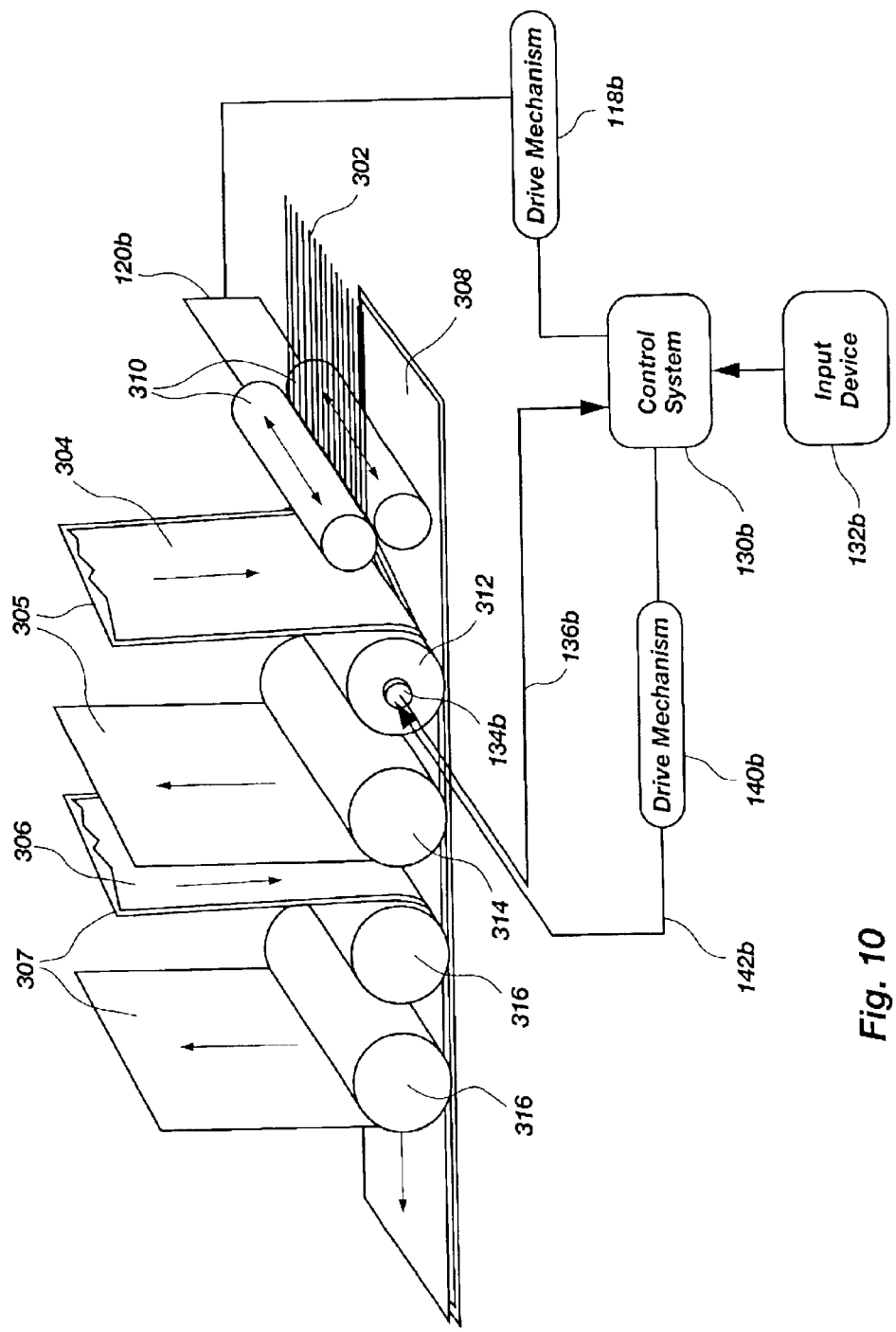
FIG. 10 is a schematic illustration of another alternate apparatus according to the original invention for manufacturing a wavy pre-preg material.
Figure 11:
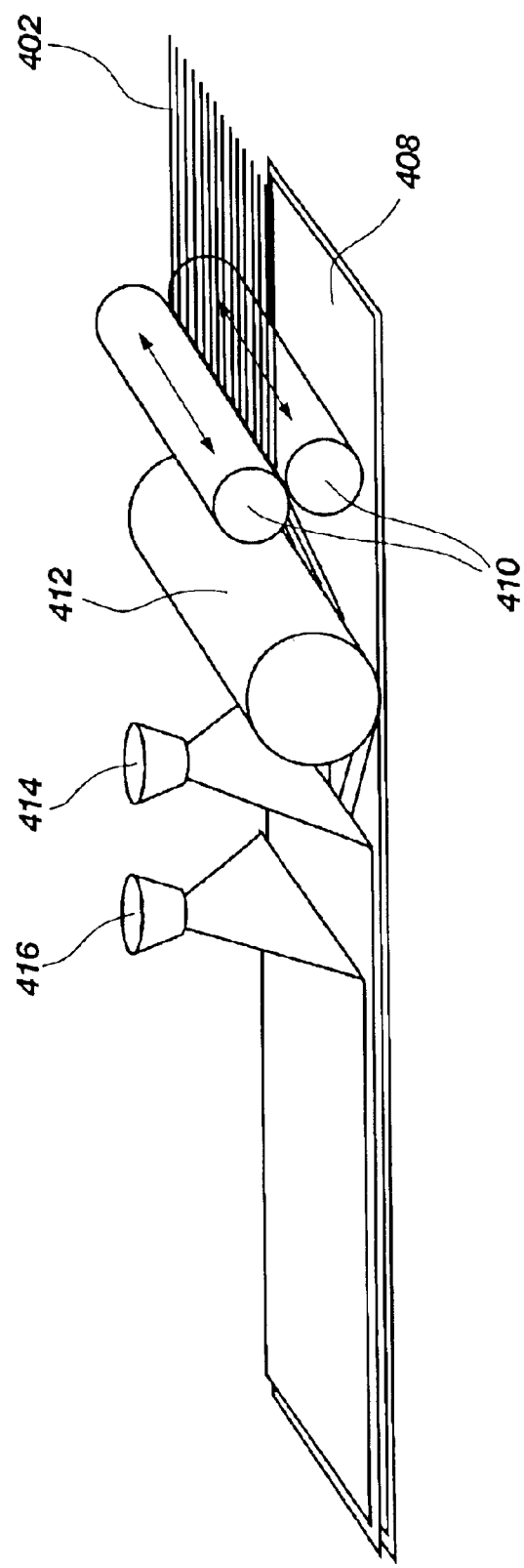
FIG. 11 is a schematic illustration of yet another alternate apparatus according to the original invention for manufacturing a wavy pre-preg material.
Figure 12:
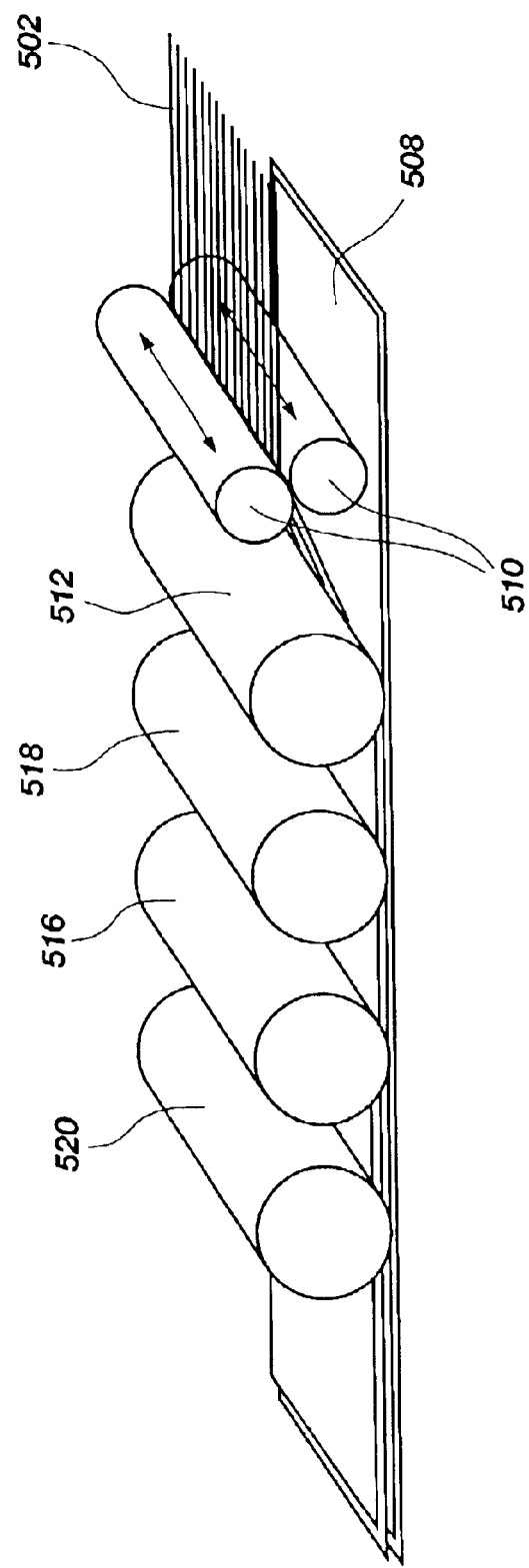
FIG. 12 is a schematic illustration of still another alternate apparatus according to the original invention for manufacturing a wavy pre-preg material.

Thus the original concept shown in FIG. 7 maintained a constant perpendicular distance between the fiber-resin paper combination rollers (108) and the fiber pinch rollers (106) which caused a variable fiber length between the rollers and resulted in dramatic increases and decreases in fiber tension and speed. The improved process maintains a more constant tension and tow speed by modifying the distance between the two sets of rollers (FIGS. 13 & 14, items 7 & 9). Small changes in the amount of fiber being combined with the resin causes small and transitory changes in tension of the fibers between the two sets of rollers (FIGS. 13 & 14, items 7 & 9), but the effects are not noticeable with the improved process and any deviation is easily controlled by the tow tensioner (FIGS. 13 & 14, item 4).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Example Control Algorithm for the Improved Process

The improved wavy pre-preg process utilizes servos, drive motors, computer automated controls and an X-Y table to place a sinusoidal-like or other waveforms in the pre-preg. The control of the machine was accomplished with the following algorithm and pseudo code, designed to produce a sinusoidal waveform. In general there are two methods of forming the patterns in the composite: 1) control of the wave angle, and 2) control of the position of the fiber pinch rollers (FIG. 13, item 7). The following method utilizes the angle method of fabricating the wave pattern and is useful in controlling the maximum angle of the fiber in the pattern.

Variable definitions $\theta_0$ is the maximum angle of the wave form;

θ is the angle at any given position;

L is the half wave-length of the wave form;

$V_x$ is the constant feed speed of the fiber-resin combination rollers;

D is the baseline (or initial) perpendicular distance between the fiber-resin combination rollers and the fiber pinch rollers;

$X_D(i)$ is the perpendicular distance between the fiber-resin combination rollers and the fiber pinch rollers at any point in time;

Y(i) is the transverse distance between the fiber-resin combination rollers and the fiber pinch rollers at any point in time;

R is the radius of the tow arc;

Δh is the step size of one coordinated move;

Calculate R:

$$R = \frac{D}{\cos(\theta_0)} \qquad \text{Eqn. 1}$$

Calculate the time for a given move:

$$\Delta t = \frac{\Delta h}{V_x} \qquad \text{Eqn. 2}$$

Begin the wavy pattern compiled loop for both axis, x(i+1) position:

$$x_{i+1} = x_i + \Delta h \qquad \text{Eqn. 3}$$

The fiber angle calculation as a function of linear x-position of the fiber-resin combination rollers for a simple sine wave of wave-length 2L where the maximum fiber angle is controlled is:

$$\theta = \theta_0 \cdot \cos\left(\frac{\pi \cdot x_{i+1}}{L}\right) \qquad \text{Eqn. 4}$$

Calculate the X-Y table D(t) position:

$$X_D(i+1) = R \cdot \cos(\theta) \qquad \text{Eqn. 5}$$

The calculated Y(i+1) position:

$$Y(i+1) = X_D(i+1) \cdot \tan(\theta) \qquad \text{Eqn. 6}$$

Delta $X_D$, the change in distance between the fiber pinch rollers (7) and fiber-resin combination rollers (9) (reference FIG. 13):

$$\Delta X_D = X(i+1) - X(i) \qquad \text{Eqn. 7}$$

Delta Y:

$$\Delta Y = Y(i+1) - Y(i) \qquad \text{Eqn. 8}$$

$V_D$, the absolute velocity of the $X_D$-axis move:

$$V_D = \left| \frac{\Delta X_D}{\Delta t} \right| \qquad \text{Eqn. 9}$$

$V_Y$, the absolute velocity of the y-axis move:

$$V_Y = \left| \frac{\Delta Y}{\Delta t} \right| \qquad \text{Eqn. 10}$$

It will be appreciated by those of skill in the art that many types of waveforms could be created using a similar method as described above. A fourier series expansion may be used to represent nearly any desired waveform and the computer may be programmed to output the new x,y position data (and $V_x$, $V_y$ velocity data) corresponding of the incremental changes in $\theta$.

The wave-on-wave pattern shown in FIG. 4, can be fabricated by using Equation 11. The maximum fiber angle is controlled by the factor $\theta_0$. This formula would be substituted in place of Equation 4.

$$\theta = \theta_0 \cdot \left[ .2 * \cos\left(\frac{n \cdot \pi \cdot x_{i+1}}{L}\right) + .8 * \cos\left(\frac{\pi \cdot x_{i+1}}{L}\right) \right] \qquad \text{Eqn. 11}$$

Optimization of this waveform would likely be accomplished by varying the weight of each wave component (in this example 0.2 and 0.8 are used), "n" the number of smaller waves per larger wave, L the length of the larger half wave-length, and $\theta_0$ the maximum angle of the fiber lay. This could be done by an optimization routine or by a design-of-experiments (DOE).

If done by an optimization program, the outputs (stiffness and damping) would be weighted based upon their relative importance and iterative calculations accomplished to determine the design space and optimal combinations of parameters. If the parameters are optimized by a design-of-experiments (DOE), levels would be chosen for each factor and a test matrix would be chosen to determine the optimal combinations. This concept wave might be useful for designs where the damping of structural modes requires a combination of wave parameters. It is left to further research to determine if such a form is necessary, but it is sufficient to know that such a form is now possible.

Optimization of this wave form would be accomplished by varying the weight of each sine wave component, "n" the number of smaller waves, L the length of the larger half wave-length, and $\theta_o$ the maximum angle of the fiber lay. This could be done by an optimization routine or by a DOE. If done by an optimization program, the outputs (stiffness and damping) would be weighted based upon their relative importance and iterative calculations accomplished to determine the design space and optimal combinations of parameters. If the parameters are optimized by a design-of-experiments, levels would be chosen for each factor and a test matrix would be chosen to determine the optimal combinations For example, one factor is the wave-length of the larger wave (2L). The designer may choose three levels for L of 2, 3, and 4 (inches) so that a non-linear estimate could be obtained for the final optimized design. A good reference for designs-of-experiments may be found in *Taguchi Techniques for Quality Engineering*, by Phillip J. Ross, McGraw-Hill Book Company, 1988, incorporated herein by reference.

Figure 2:
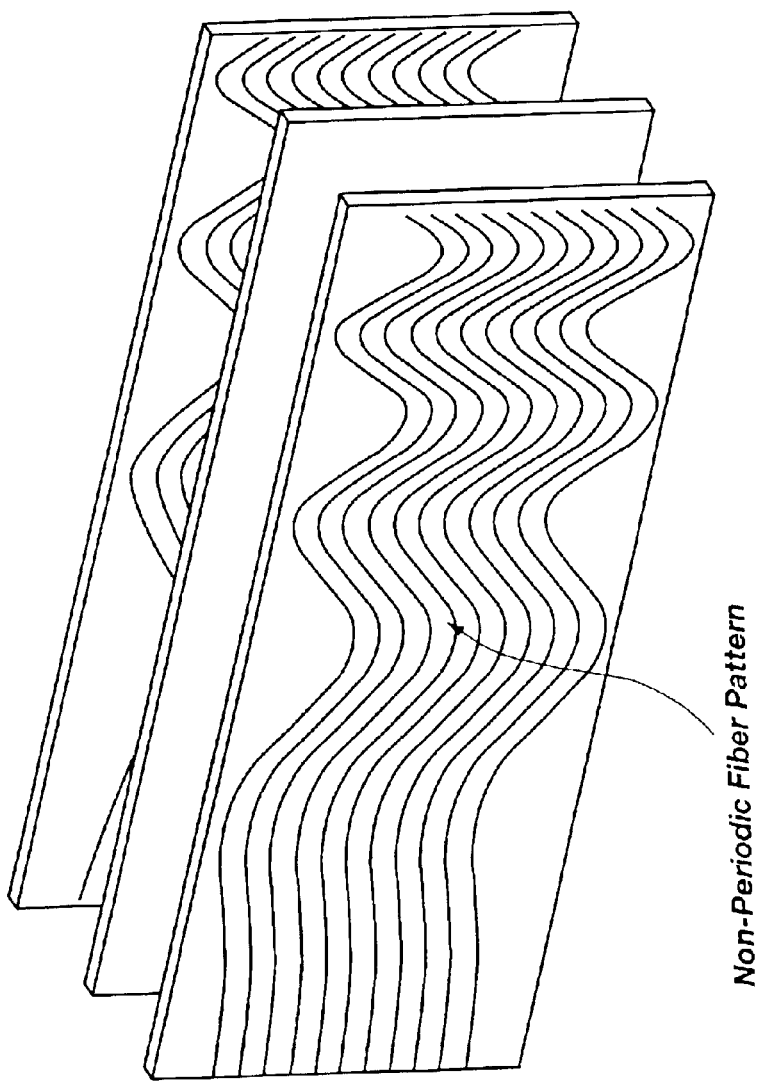
FIG. 2 is an exploded perspective view of a composite material according to an alternate embodiment of the original invention.
Figure 3:
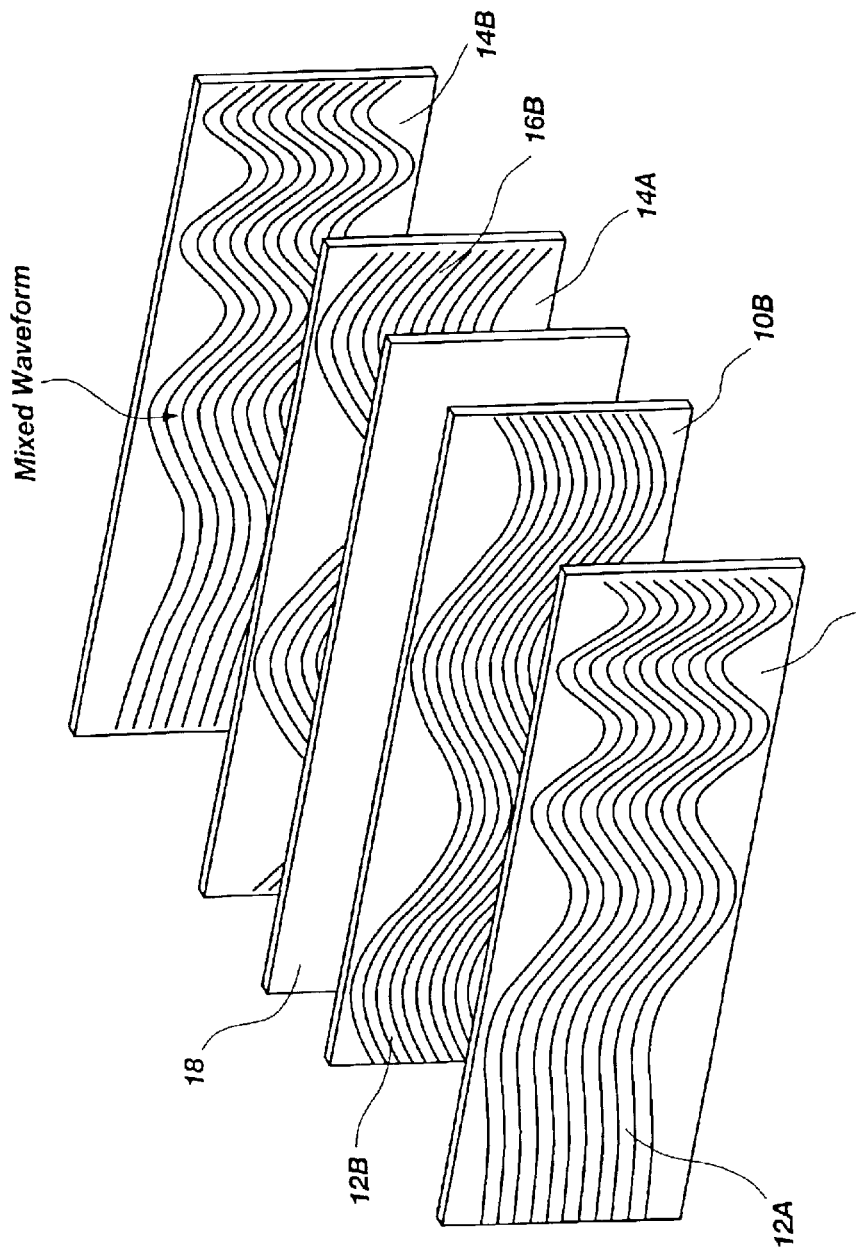
FIG. 3 is an exploded perspective view of a composite material according to another embodiment of the original invention.
Figure 5:
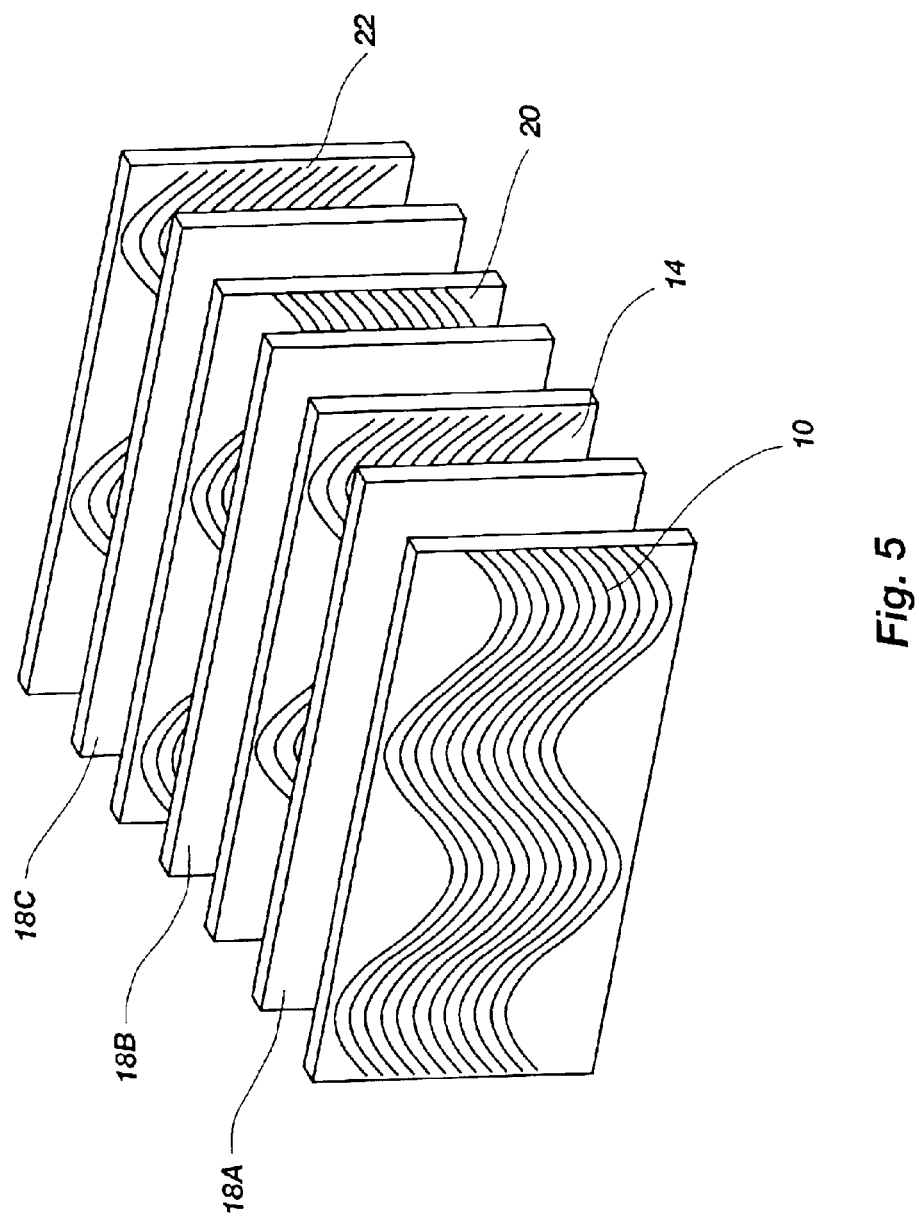
FIG. 5 is an exploded perspective view of a composite material according to yet another alternate embodiment of the original invention.
Figure 6A:
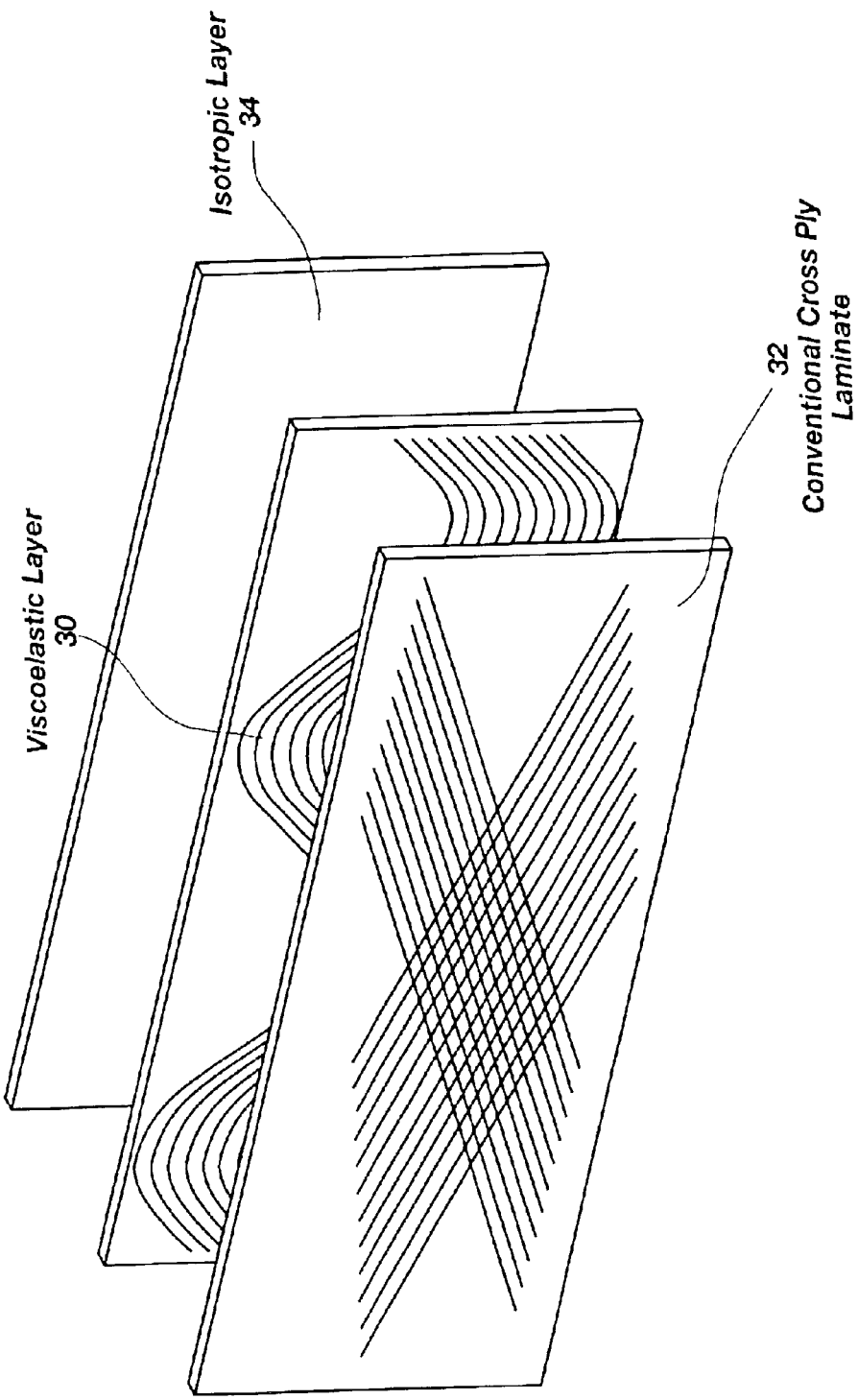
FIGS. 6A, 6B and 6C are exploded perspective views of a composite material and damping layer coupled to an isotropic layer in accordance with another embodiment of the original invention.
Figure 6B:
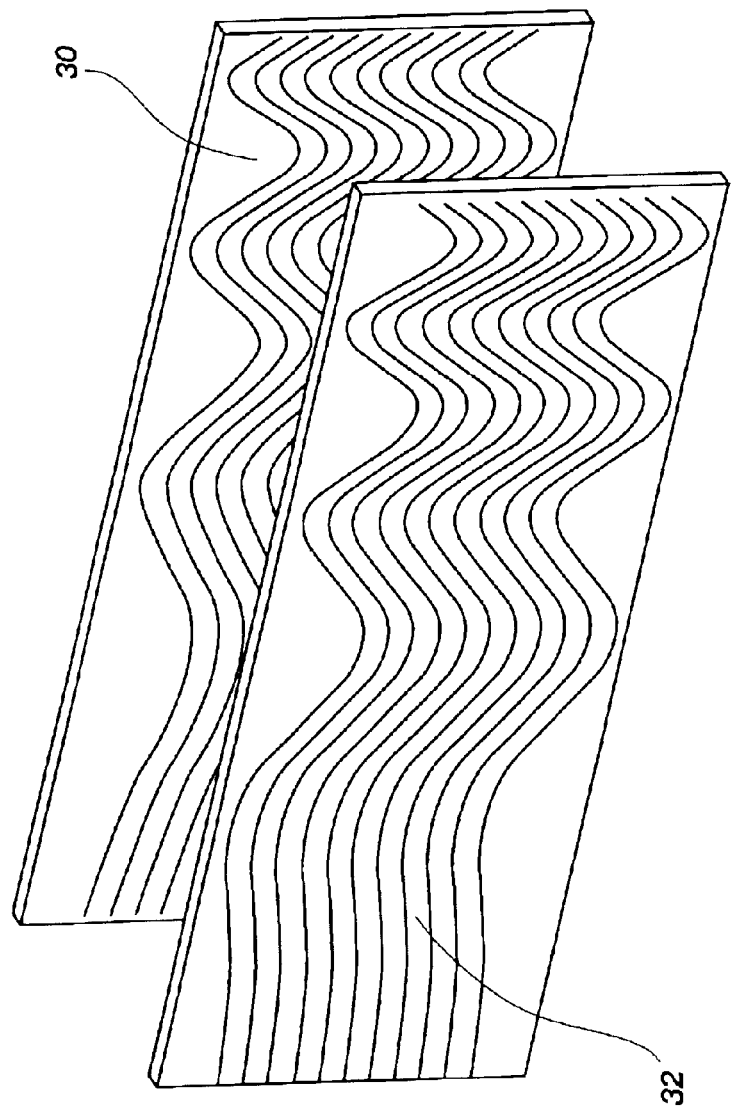
Figure 6C:
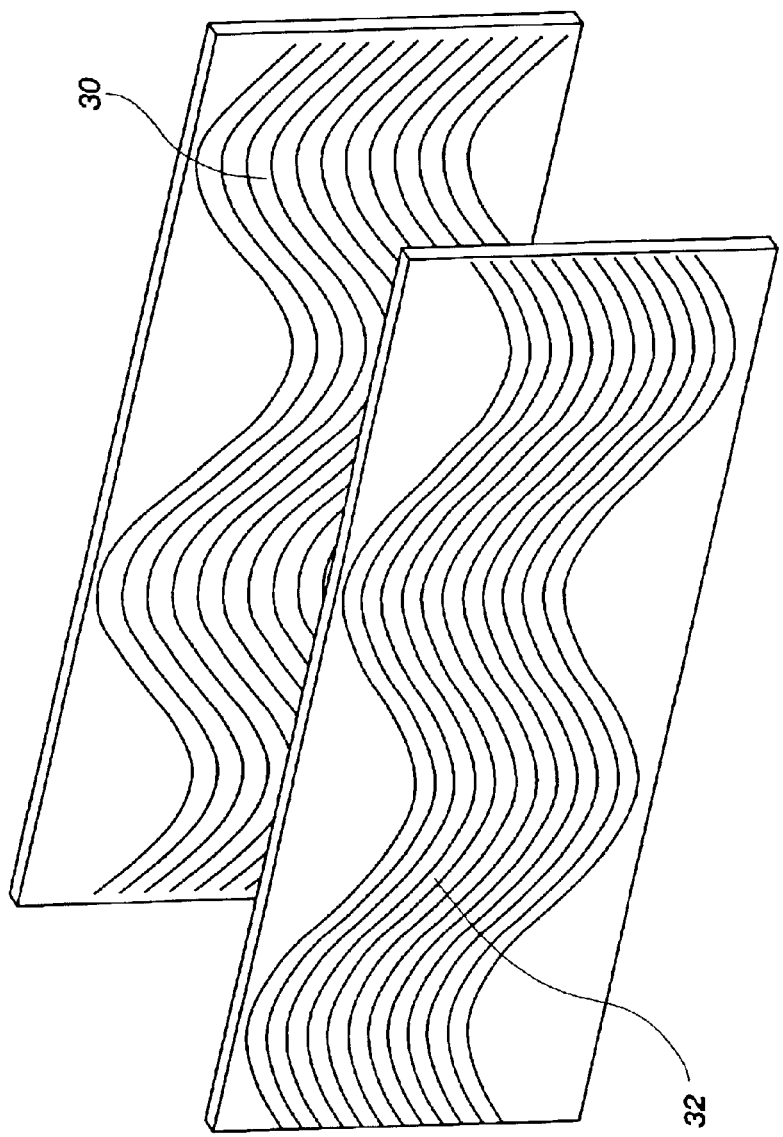

As another example, the waveform of FIG. 2 may be fabricated using Equation 12. To control the fiber angle of a similar variable wave-length where the maximum fiber angle is held constant, the formula given in Equation 12 would be used and substituted in place of Equation 4.

$$\theta = \theta_0 \cdot \cos\left(\frac{\pi \cdot x_{i+1}}{L - \frac{x_{i+1}}{A}}\right) \qquad \text{Eqn. 12}$$

Optimization of this waveform would vary the wavelength (variable A), L the length of the beginning half wave-length, and $\theta_0$ the maximum angle of the fiber lay. This could be done by an optimization routine or by a design-of-experiments. If done by an optimization program, the outputs (stiffness and damping) would be weighted based upon their relative importance and iterative calculations accomplished to determine the design space and optimal combinations of parameters. If the parameters are optimized by a design-of-experiments, levels would be chosen for each factor and a test matrix would be chosen to determine the optimal combinations.

This concept wave might be useful for designs where the damping of structural modes changes as a function of the extended length, taper of a shaft (for example), or other structural requirement. It is left to further research to determine if such a form is necessary. As described above, this machine also has the flexibility of producing any number of wave patterns tailored to the dynamics of a specific structure.

There are many ways to implement the mechanical/electrical controls including but not limited to cams, linkages, mechanical devices, and including various methods of sensing, position control, and computer control. In this example, computer control was used because it could be combined with optimization, drafting, analysis, design, and other computer programs, to create a concept-to-production capability.

Summary of Process Improvements

The original prototype wavy pre-preg process was limited to waveforms with a wave-length greater than or equal to the center-to-center distance between the pinch rollers. On the prototype machine, the distance between the 5 cm rollers was 6 cm (center to center). This limited the useable waveform that could be produced by the prototype to $\geq 6$ cm. For any waveform less than 6 cm, the fibers between the rollers would become slack and the wavy pattern would become ragged in appearance with random gaps between the fibers and tows. The fiber demanded from the creel would speed up or slow down or even stop (and go slack) according to the shape of the waveform. This effects the tension on the tow, accuracy of the fiber lay, and quality of the pre-preg produced.

The improvement claimed is that the use of this X-Y table (FIGS. 13–14 item 6) with attached pinch rollers, spreader rollers, tow tensioner, and adjustable comb (FIGS. 13–14 items 3,4,5,7) will solve the problems of tension variability of the fiber tow as it passes between the pinch rollers and the fiber-resin rollers. By moving in both the X or longitudinal and Y or transverse directions (i.e. moving in a plane), uniform tension is maintained in the tow, thereby allowing more accurate placement of fibers in the desired waveforms and the production of a wider variety of useable waveforms than is possible with any prior methods (references 8–12) or the original version of the present invention (FIG. 7).

This X-Y table may be utilized with most existing machinery already used to manufacture unidirectional or woven pre-preg. In this case one need only add the X-Y table apparatus (FIGS. 13–14 items 6 and 7) with optional attachments (items 3–5, 17, 18) to the front of most existing pre-preg processes (items 8–15), add computer or other control means (items 16, 19, 21) and the modified machine/process will have the additional capability of producing wavy patterned fiber pre-preg. Additional advantages and modifications will readily occur to those skilled in the art. Therefore, the invention in its broader aspects is not limited to the specific details, and the representative devices shown and described herein. Accordingly, various modifications may be made without departing from the spirit and scope of the general inventive concept as defined by the appended claims and their equivalents.

I claim:

1. A method of fabricating an impregnated material comprising the steps of:
   a. Passing a plurality of fibers between a first group of at least two rollers, said rollers contacting said plurality of fibers therebetween for moving same along a positive longitudinal direction,
   b. Then passing said plurality of fibers to a second group of at least two rollers, said rollers contacting said plurality of fibers therebetween for moving same along said positive longitudinal direction,
   c. Relatively moving at least one of said first and second groups of rollers, in both a positive and negative longitudinal direction as well as a positive and negative transverse direction while each of said first and second groups of rollers contact said plurality of fibers thereby moving said plurality of fibers generally in a curve relative to said positive longitudinal direction while keeping said first and second groups of rollers substantially parallel to each other such that relative transverse motion between said first group and said second group tends to create with said fibers a waveform approximating a desired waveform and relative longitudinal motion between said first group and said second group maintains a more uniform tension on said fibers than would exist with only relative transverse motion between said first group and said second group in order to minimize deviations from the desired waveform in the waveform produced by said first group and said second group, and
   d. Applying a matrix to said fibers as said fibers pass proximate said second groups of rollers.

2. The method as recited in claim 1 wherein said applying step comprises applying an uncured polymer matrix to said fibers as said fibers pass proximate said second group of rollers.

3. The method as recited in claim 1 wherein said applying step comprises applying a viscoelastic material to said fibers as said fibers pass proximate said second group of rollers.

4. The method as recited in claim 1 wherein the step of longitudinally and transversely relatively moving in a curve comprises:
   a. Utilizing a controller to generate control signals according to a desired waveform for said fibers and,
   b. Feeding said control signals to a device for relatively moving at least one of said group of rollers with respect to the other of said group of rollers in said longitudinal and transverse directions to thereby cause the shape of said fibers to conform to said desired waveform.

5. The method as recited in claim 4 wherein said controller comprises an electronic controller and said control signals comprise electronic control signals which generate a waveform varying in at least one characteristic selected from the group consisting of wave-length, amplitude, and shape.

6. The method as recited in claim 1 wherein the step of transversely and longitudinally relatively moving comprises:
   a. Utilizing non-electronic control means for generating the desired waveform for said fibers and,
   b. Feeding said non-electronic control means to a device for relatively moving at least one of said group of rollers with respect to the other of said group of rollers in said transverse and longitudinal direction to thereby cause the shape of said fibers to conform to said desired waveform.

7. The method as recited in claim 6 wherein said non-electronic control means comprises a system of cams and linkages and said non-electronic control signals comprise mechanical signals.

8. The method as recited in claim 1, wherein said step of applying the matrix includes applying a carrier onto said fibers.

9. The method as recited in claim 1 further comprising using a tow tensioner made of moveable or immovable rollers which serves as a tensioner for the fibers to maintain constant pressure and tension and prevent slacking and slippage of the fibers.

10. A method of fabricating an impregnated material comprising the steps of:
    a. Passing a plurality of fibers between a first group of at least two rollers, said rollers contacting said plurality of fibers therebetween for moving same along a positive longitudinal direction,
    b. Then passing said plurality of fibers to a second group of at least two rollers, said rollers contacting said plurality of fibers therebetween for moving same along said positive longitudinal direction,
    c. Relatively moving at least one of said first and second groups of rollers, in both a positive and negative longitudinal direction as well as a positive and negative transverse direction while each of said first and second groups of rollers contact said plurality of fibers thereby moving said plurality of fibers generally in a curve relative to said positive longitudinal direction while keeping said first and second groups of rollers substantially parallel to each other such that relative transverse motion between said first group and said second group tends to create with said fibers a waveform approximating a desired waveform and relative longitudinal motion between said first group and said second group maintains a more uniform tension on said fibers than would exist with only relative transverse motion between said first group and said second group in order to minimize deviations from the desired waveform in the waveform produced by said first group and said second group, d. Applying a resin matrix to said fibers as said fibers pass proximate said second groups of rollers and, e. Positioning a viscoelastic material adjacent said fibers.

11. The method as recited in claim 10 wherein said positioning said viscoelastic material includes co-mingling said viscoelastic material with said fibers.

12. The method as recited in claim 10 wherein said positioning step is performed after said resin matrix applying step.

13. The method as recited in claim 10 wherein said positioning step includes applying said viscoelastic material to said fibers at the same time as applying said resin matrix.

14. The method as recited in claim 10 wherein the step of transversely and longitudinally relatively moving comprises:

a. Utilizing an electronic controller to generate control signals according to a desired waveform for said fibers and, b. Feeding said control signals to a device for relatively moving at least one of said group of rollers with respect to the other of said group of rollers in said transverse and longitudinal direction to thereby cause the shape of said fibers to conform to said desired waveform.

15. The method as recited in claim 14 wherein said electronic controller generates control signals corresponding to a waveform varying in at least one characteristic selected from the group consisting of wave-length, amplitude, and shape.

16. The method as recited in claim 10 wherein the step of transversely and longitudinally relatively moving comprises:

a. Utilizing non-electronic control means for generating the desired waveform for said fibers and, b. Feeding said non-electronic control means to a device for relatively moving at least one of said group of rollers with respect to the other of said group of rollers in said transverse and longitudinal direction to thereby cause the shape of said fibers to conform to said desired waveform.

17. The method as recited in claim 16 wherein said non-electronic control means comprises a system of cams and linkages and said non-electronic control signals comprise mechanical signals.

18. The method as recited in claim 10 further comprising using a tow tensioner made of movable or immovable rollers which serves as a tensioner for the fibers to maintain constant pressure and tension and prevent slacking and slippage of the fibers.

\* \* \* \* \*